United States Patent [19]

Irwin

[11] Patent Number: 5,806,745
[45] Date of Patent: Sep. 15, 1998

[54] ADJUSTABLE CONVEYOR FOR DELIVERING THIN WEB MATERIALS

[75] Inventor: Jere F. Irwin, Yakima, Wash.

[73] Assignee: Irwin Research and Development, Inc., yakima, Wash.

[21] Appl. No.: 870,145

[22] Filed: Jun. 5, 1997

[51] Int. Cl.[6] .............................. G03B 1/30; B65H 20/00
[52] U.S. Cl. .............................. 226/74; 226/53; 226/179; 219/388
[58] Field of Search .............................. 226/53, 74, 174, 226/179; 219/388

[56] References Cited

U.S. PATENT DOCUMENTS

| | | |
|---|---|---|
| 3,161,915 | 12/1964 | Thiel . |
| 3,348,748 | 10/1967 | O'Brien et al. ............................ 226/53 |
| 3,721,377 | 3/1973 | Atkinson .............................. 226/179 X |
| 3,837,782 | 9/1974 | Meissner et al. . |
| 3,941,288 | 3/1976 | Wanat .................................. 226/179 X |
| 4,009,981 | 3/1977 | Rosen . |
| 4,368,024 | 1/1983 | Asano . |
| 5,022,336 | 6/1991 | Iwase ..................................... 226/53 X |
| 5,188,269 | 2/1993 | Nakano ..................................... 226/74 |
| 5,307,610 | 5/1994 | Schneider et al. . |
| 5,354,139 | 10/1994 | Barrus et al. .......................... 226/74 X |
| 5,605,709 | 2/1997 | Morimoto et al. .................... 226/53 X |
| 5,667,122 | 9/1997 | Young, Jr. et al. .................... 226/53 X |

Primary Examiner—Michael Mansen
Attorney, Agent, or Firm—Wells, St. John, Roberts, Gregory & Matkin, P.S.

[57] ABSTRACT

A web handling apparatus for delivering thin web materials comprises a support frame; a pair of laterally spaced-apart and substantially longitudinally extending frame rails carried by the support frame and positioned to support a web of material delivered therebetween. It also includes a support rail affixed outwardly of each frame rail adjacent an exit end, the support rails configured to support the pair of frame rails from the support frame wherein unobstructed access between the frame rails is provided from the exit end. In addition, it includes an adjustment mechanism positioned to adjust relative positioning of the pair of frame rails in spaced-apart relation.

42 Claims, 15 Drawing Sheets

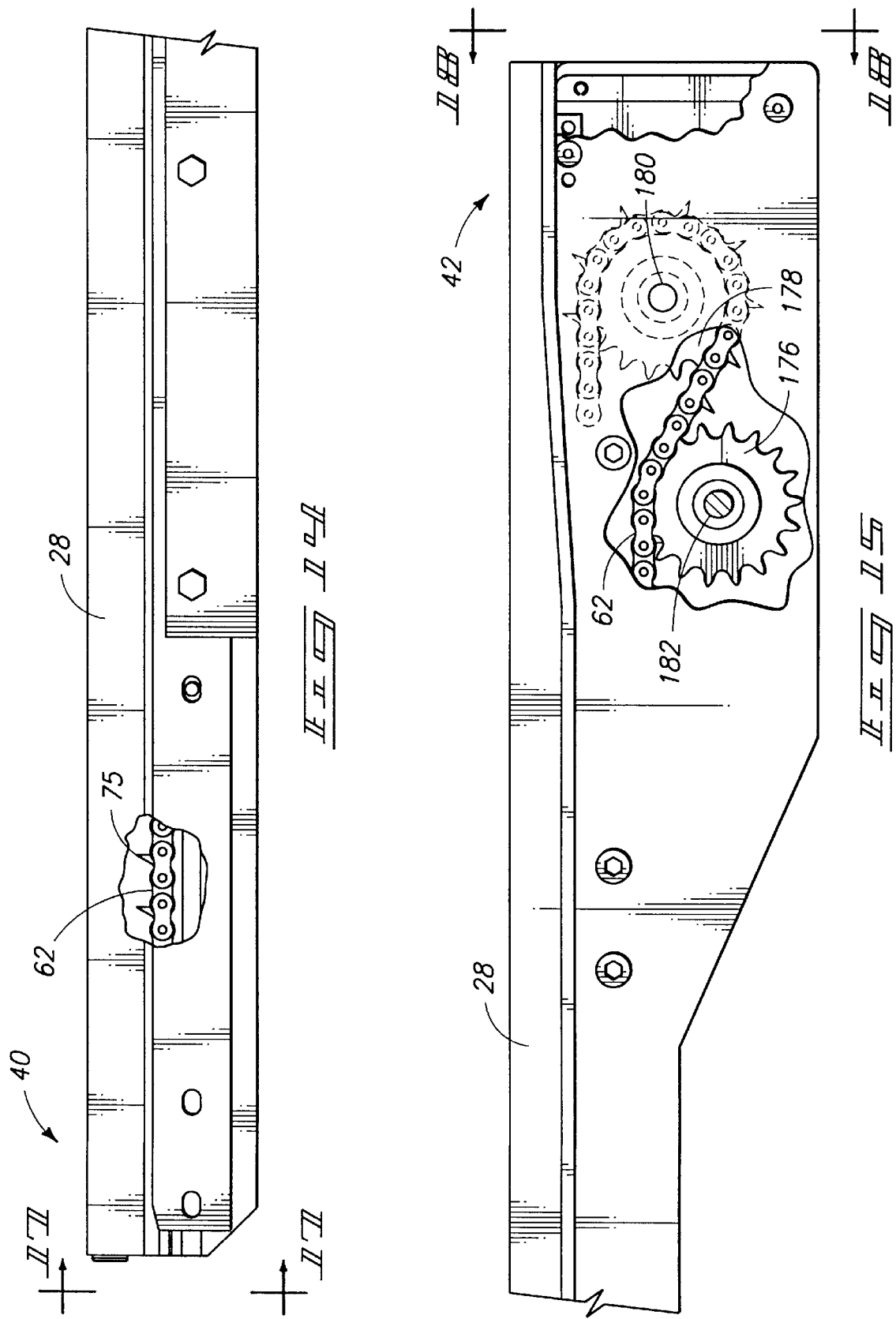

ADJUSTABLE CONVEYOR FOR DELIVERING THIN WEB MATERIALS

TECHNICAL FIELD

This invention relates to apparatus for conveying thin web materials particularly for delivery through an automated, or semi-automated material processing operation when thermo-forming and separating thin walled plastic articles.

BACKGROUND OF THE INVENTION

During the manufacture and forming of many products, thermo-forming machines are used to simultaneously mold large quantities of plastic thin-walled articles from a continuous sheet or web of thermo-formable plastic material. A typical molded article has one of a large variety of generally cup- or bowl-shaped constructions being provided with two-piece dies or molds suitable for imparting to the finished piece its final desired shape. A typical thermo-forming machine has a pair of mating male and female dies, or molds that are brought together on opposed sides of a pre-heated web of plastic material, during an operating cycle. Usually, a plurality of mating male and female dies are provided on bottom and top platens, or die carriers, respectively, enabling production of a plurality of articles during a single cycle of operation.

Such prior devices have provided vast improvements to the rate with which articles can be produced from a single machine. However, to enable continuous and undelayed production of articles from a thermo-forming machine, a continuous web of material has to be delivered by a conveyor from a roll, through a heat oven, and into a thermo-forming machine. In this manner, the feeding, heating, and forming of plastic articles can be carried out via a cyclical, and substantially continuous computer controlled and servo motor driven processing operation.

A typical thermo-forming machine is constructed to removably receive interchangeable die faces on the platens of the machine. Such a die face typically contains a large number of individual die. One problem caused by the provision of interchangeable die faces results from a concomitant need to provide different width webs of material to accommodate the various die faces and articles being manufactured. When the width of a web is changed because of a die face change, the conveyor must usually be modified, changed, or resized in order to accommodate the new web width. Such modification is typically labor intensive, involving disassembly and reassembly of conveyor components. Often times, the thermo-forming machine is inoperative for an extended period of time while the conveyor is fixtured and reassembled to accommodate the new web width. Therefore, improvements are needed to enable simplified adjustment to the web width of a conveyor.

Another problem causing a need for adjustable conveyors results from webs that are formed with non-standard widths, or with widths that vary from piece to piece. A typical web piece is stored in the form of a roll, the roll being unwound as the web is feed via a conveyor during a forming operation. Such webs come in various widths which causes an operator to adjust the width of a conveyor by disassembling the conveyor and refixturing it to match the new web width.

Yet another problem causing a need for an adjustable conveyor are variations in web width resulting from changes in web width produced during a processing operation. For example, some web materials will contract when heated in an oven, causing the width to decrease, while other web materials will expand, causing the web width to increase. Even further, longitudinal stretch and/or lateral tension caused during a thermo-forming operation can reduce the web width. Therefore, there is also a need to adjust a web conveyor to accommodate changes in web width that can occur along the web delivery path of certain conveyors.

Previously, conveyors were constructed to have a pre-designed configuration, with little or no ability to adjust the web width over the travel path of the web. Similarly, there existed little or no ability to adjust the web width to accommodate webs having different widths. Therefore, yet even further improvements are needed to provide a simple and easily adjusted conveyor for use in delivering a web of material through a processing machine. The objective of the present invention is to provide a vastly improved adjustable conveyor for use in conveying thin web materials particularly for forming operations utilizing a thermal oven and a thermo-forming machine.

BRIEF DESCRIPTION OF THE DRAWINGS

Preferred embodiments of the invention are described below with reference to the following accompanying drawings.

FIG. 14 is an enlarged partial and breakaway view of the entrance end of the right chain rail, but with the right chain drive and tensioner assemblies removed, illustrating the location of the right conveyor chain and delivery teeth within the rail;

FIG. 15 is an enlarged partial and breakaway view of the exit end of the right chain rail;

DETAILED DESCRIPTION OF THE PREFERRED EMBODIMENTS

Figure 1:
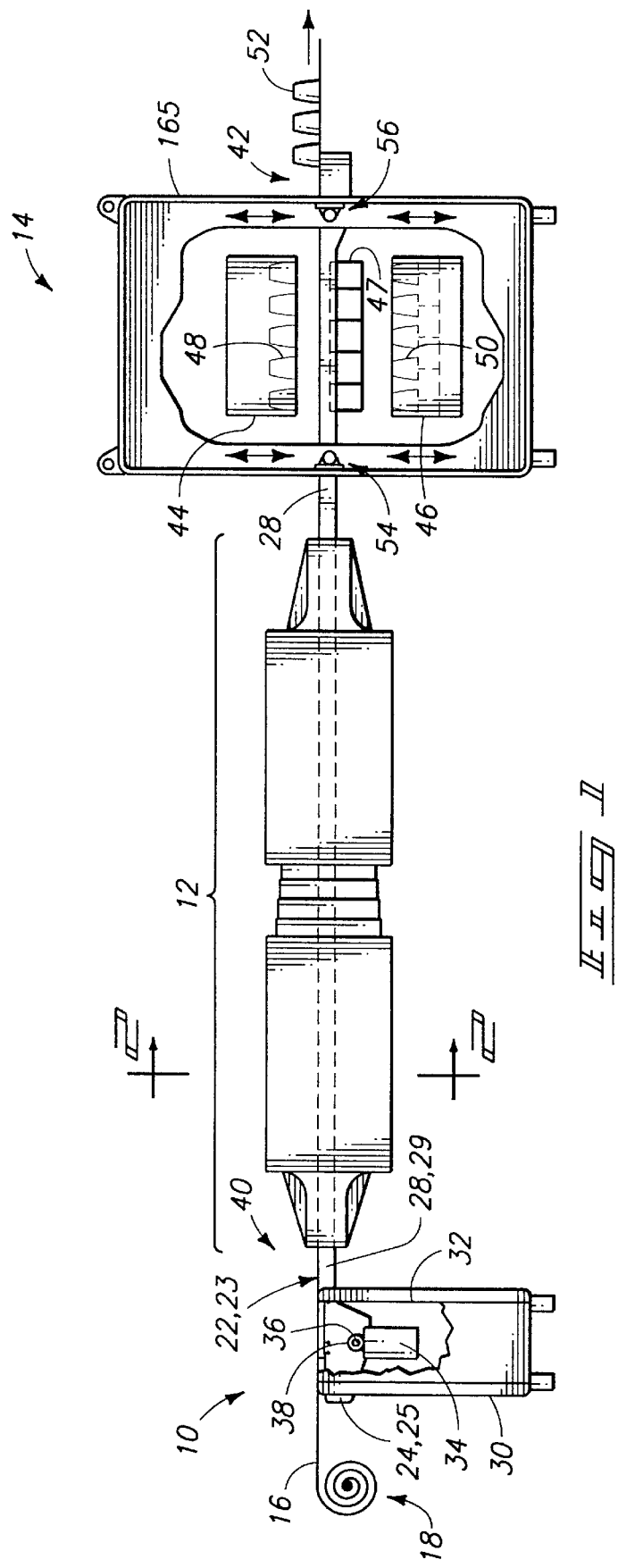
FIG. 1 is a schematic side view representation of an adjustable conveyor in accordance with a preferred embodiment of the invention illustrating the conveyor assembled between an oven and a thermo-forming machine for conveying a thin web of thermo-formable plastic material from a delivery roll.

This disclosure of the invention is submitted in furtherance of the constitutional purposes of the U.S. Patent Laws "to promote the progress of science and useful arts" (Article 1, Section 8).

In accordance with one aspect of this invention, a conveyor for delivering thin web materials includes a support frame for carrying a pair of laterally spaced-apart and substantially longitudinally extending frame rails. The frame rails are positioned to deliver a web of material. An adjustment mechanism is also positioned to adjust relative positioning of the pair of frame rails in spaced-apart relation.

In accordance with another aspect of this invention, a conveyor for delivering thin web materials includes a first guide rail constructed and arranged to receive and deliver a first edge of a web of material to be conveyed. The conveyor also includes a second guide rail laterally spaced apart from the first guide rail and constructed and arranged to receive and deliver a second opposite edge of the web of material to be conveyed. Additionally, the conveyor includes an extensible cross-member assembly affixed to the first guide rail at one end and to the second guide rail at an opposite end, the cross-member assembly configured to retain the first and second guide rails in adjustable spaced-apart relation.

In accordance with yet another aspect of this invention, a conveyor for delivering web-shaped materials includes a pair of spaced-apart and elongate frame rails positioned to deliver a web of material. The conveyor also includes an adjustable support frame interconnecting the frame rails, the frame rails being adjustably positioned relative to one another by adjusting the support frame so as to laterally position the pair of frame rails in spaced-apart relation.

A preferred embodiment of an adjustable conveyor is generally designated with the reference numeral 10. For purposes of illustration, conveyor 10 is shown mounted for delivering a web 16 of thermo-formable material through a thermo-forming oven and a thermo-forming machine (or former). Oven 12 and former 14 are configured for cycle-based operation, with conveyor 10 delivering web 16 in increments from a delivery roll 18 through oven 12 and former 14, with web 16 being held stationary during each forming operation. Conveyor 10 is driven by a servo drive motor 20 whose operation is controlled by a system operating computer (not shown). A machine control system is implemented on the computer in a combination of software and hardware typically on a dedicated system control computer to coordinate and control the operation of conveyor 10, oven 12, and former 14. Additionally, a trim press (not shown) and a web recycling machine (not shown) can also be controlled via the same machine control system. However, it is envisioned that any of a number of presently available machine control systems can be used, including combinations of purely mechanical kinematic linkages. Additionally, conveyor 10 can be constructed to continuously deliver web 16 through a processing machine at a constant line speed. For example, conveyor 10 can deliver web 16 through a pair of rotary dies such as those disclosed in U.S. Pat. No. 4,608,895 to Bell, et al.

Figure 11:
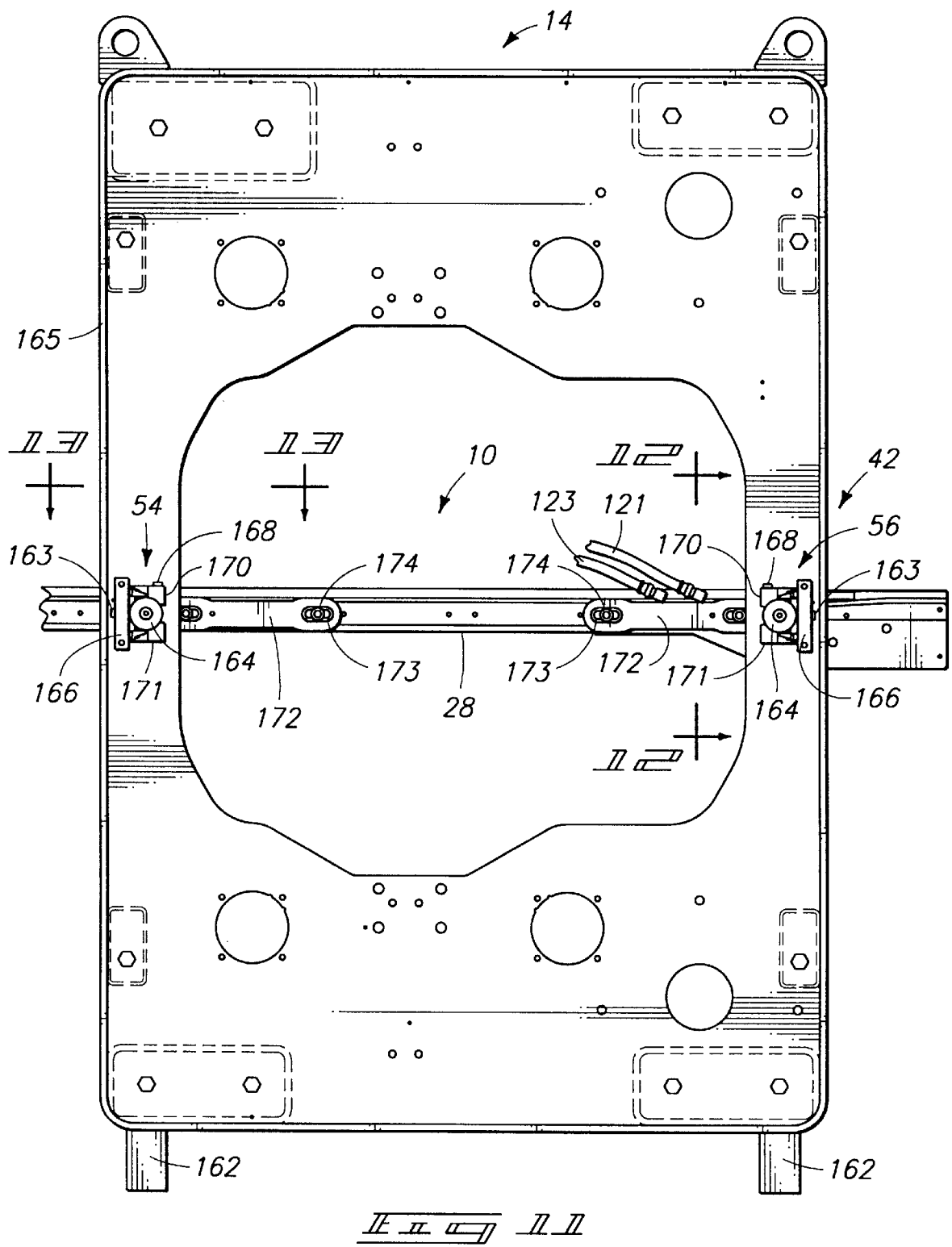
FIG. 11 is an enlarged vertical view of an exit end of the conveyor of FIG. 1 illustrating the support rail assemblies used for adjustably affixing the chain rails to the former.

Thermal forming machine, or former, 14 consists essentially of a thermal forming rotary driven press. Further details of such a thermal forming machine are disclosed in applicant's U.S. patent application Ser. No. 08/632,930 filed on Apr. 16, 1996, and entitled "An Improved Mold Assembly and Seal Arrangement for Use with a Thermo-Forming Machine", listing the inventor as Jere F. Irwin. This Ser. No. 08/632,930 application hereby incorporated by reference. Details of former 14 have been simplified since its actual construction and operation is not important to operation and implementation of conveyor 10, as long as former 14 supports an exit end 42 of conveyor 10. It is to be understood that former 14, as shown in FIGS. 1 and 11, has an upper an a lower kinematic drive linkage assembly (not shown) configured to support and drive associated upper and lower platens 44 and 46 for forming articles 52 in web 16. Mounting apertures for supporting such kinematic linkages can be seen in frame 165 of former 14 as shown in FIG. 11. However, such features are not important to implementation of this invention, and have been omitted to simplify the description of conveyor 10.

Conveyor 10 delivers web 16 from a storage roll 18, through a heating oven 12, and through former 14 where web 16 is molded into articles 52 as depicted in FIG. 1. Former 14 is opened and closed onto heated plastic web 16 by one or more rotary electric servo motor drives configured to drive the associated kinematic linkages (not shown) and dies 44 and 46. In this manner, the male and females dies of former 14 impart molded features into web 16. In operation, it becomes necessary to choreograph movement of former 14 with conveyor 10 in order to optimize the production rate of articles 52 being formed in forming machine 14. For example, conveyor 10 is operated so as to feed web 16 when dies 44 and 46 of former 14 are separated or opened, allowing feeding of new material to be formed within former 14. However, conveyor 10 is stopped when dies 44 and 46 of former 14 are closed together, or nearly closed, during an actual thermo-forming step.

Preferably, a modern rotary electric servo motor drive, or actuating device, is used for drive 20, as well as for the drives (not shown) used to open and close dies 44 and 46. Such a drive includes an AC servomotor and an associated servo drive motor controller. For example, one suitable AC motor is sold be Siemens AG, Automation Group, Automation Systems for Machine Tools, Robots and Special-Purpose Machines, P.O. Box 31 80, D—91050 Erlangen, Federal Republic of Germany. Additionally, one suitable servo drive motor controller is sold by Siemens as an analog feed drive including the SIMODRIVE 611-A Transistor PWM Inverters and Motors for AC Feed Drives. Such a drive is a predictable device that can very accurately position a machine element to a desired position at a given time. Preferably, the associated servomotor is a brushless servomotor. Typically, only a nominal allowable following error (+/− FE) is produced by such a drive. Furthermore, activation of associated machine components can be triggered based on velocity or position of a drive, by using a velocity profile (or integrated displacement) of the drive.

Conveyor oven 12 is a longitudinally adjustable heating oven that enables a user to adjust the overall oven length along which web 16 is heated. Hence, a user can optimize the application of heat to web 16 by adjusting the oven length. A middle section of oven 12 has inter-nesting sections that telescope to enable an accordion-like longitudinal adjustment of the length of oven 12. Rails 22 and 23 extend completely through oven 12. However, conveyor 10 is constructed such that rails 22 and 23 are both laterally adjustably positionable within oven 12, as shown with reference to FIG. 2 below. Details of such a conveyor oven are disclosed in applicant's U.S. patent application Ser. No. 08/635,091 filed on Apr. 17, 1996, and entitled "An Improved Mold Assembly and Seal Arrangement for Use with a Thermo-Forming Machine", listing the inventor as Jere F. Irwin. This Ser. No. 08/632,930 application is hereby incorporated by reference.

As previously discussed, thermo-forming press 14 is shown in FIG. 1 in simplified form, except for the construction of frame 165. Press 14 has a top platen 44 and a bottom platen 46 that are independently movable between opened and closed positions by rotary servo motor drives (not shown) via associated kinematic drive linkages (not shown). Furthermore, a stationary array of clamping members form a unitary grid 47 on which web 16 is intermittently delivered forward, once during each forming cycle. Stationary grid 47 is carried above platen 46, with individual male die plugs 50 being carried for reciprocation within receiving passages in each individual clamping member. Bottom platen 46 forms a common plug support plate for carrying all of plugs 50 in vertically movable positions relative to grid 47 and web 16, between lowered and raised positions. Top platen 44 engages, when lowered, against unitary grid 47 of stationary clamping members, clamping web 16 there between. Bottom plate 46 is then raised, lifting plugs 50 from within the inner cavities of the clamping members, causing individual plugs 50 carried thereon to draw clamped portions of heated web 22 into individual associated cavities 48 provided in top platen 44. During a web molding operation, lower platen 46 and plugs 50 are raised toward the heated web 16, which causes web 16 to stretch into associated cavities 48, or mold surfaces where portions of web 16 are shaped therein.

As shown in FIG. 1, conveyor 10 is formed by a pair of laterally spaced-apart and substantially longitudinally extending frame rails 28 and 29 carried by frame 30 at an entrance end 40, and by central frame 165 of former 14 at an exit end 42. Frame rails 28 and 29 support and deliver web 16 along opposite edges, through oven 12 and former 14. Frame rails 28 and 29 cooperate with associated right and left chain drive assemblies 24 and 25 and right and left chain tensioner assemblies 26 and 27, respectively, to form right and left chain track assemblies 22 and 23. Chain track assemblies 22 and 23 each house right and left associated drive chains such as right drive chain 62 depicted in further detail with reference to FIGS. 2, 5–8 and 14–20. Chain 62 travels down and back within rail 28 where it perforates a right edge of web 16 with associated teeth 75 (see FIG. 5), supporting and conveying web 16 down the length of conveyor 10 while remaining in intimate contact with the right drive chain. Similarly, a left drive chain travels down and back within rail 29.

Upstream end 40 of conveyor 10 is supported for laterally adjustable positioning by a drive mechanism in the form of a linear screw motor 34, a screw shaft 36, and transfer gears 38 that couple together motor 34 and shaft 36. Additionally, downstream or exit end 42 is supported for laterally adjustable positioning by two pair of support rail assemblies 54 and 56. Preferably, each pair of support rail assemblies 54 and 56 can be secured into a particular lateral position with rails 28 and 29 spaced apart a desired distance via associated clamping features described in further detail below with reference to FIGS. 10–13. Optionally, where frame rails 28 and 29 are sized to have a substantially shorter length, the clamping features of support rail assemblies 54 and 56 can be eliminated.

According to FIG. 1, support frame 30 and former frame 165 cooperate to form a pair of first and second support frames for supporting conveyor 10 along entrance end 40 and exit end 42, respectively. The addition of a linear screw motor 34, screw shaft 36 and transfer case 38, in combination with support rail assemblies 54 and 56, provide for an adjustable support frame that enables adjustable positioning of conveyor 10 so as to position rails 28 and 29 along opposite edges of a web of material being conveyed therealong. Motor 34, screw shaft 36 and transfer case 38 provide one adjustment mechanism, and support rail assemblies 54 and 56 provide another adjustment mechanism for laterally positioning the entrance and exit ends 40 and 42 of frame rails 28 and 29, respectively. In this manner, rails 28 and 29 can be positioned so as to accommodate various changes in web width as new rolls 18 are loaded for delivery into conveyor 10. Similarly, an adjustment can be made between the lateral spaced-apart positioning of rails 28 and 29 so as to accommodate changes in width of web 16 as it is conveyed along conveyor 10.

As shown in FIG. 1, linear screw motor 34 is supported along an exterior of frame 30, within a dependent screw drive motor housing 32. Motor 34 is switch actuated by an operator in either a clockwise or a counterclockwise drive motion to laterally position frame rails 28 and 29. Clockwise motion imparts associated clockwise rotation of screw shaft 38, via transfer gears (or drive train) 38, moving rails 28 and 29 in a lateral direction away from one another. Counterclockwise motion imparts an associated counterclockwise rotation, moving rails 28 and 29 closer together. Alternatively, motor 34 can be automatically driven via a computer control system and a pair of sensors (not shown) positioned to monitor the edge positioning, or width, of web 16 during operation. In this manner, rails 28 and 29 can be laterally adjusted "on the fly" as the sensors determine the required lateral positioning of rails 28 and 29 during operation of conveyor 10.

Figure 2:
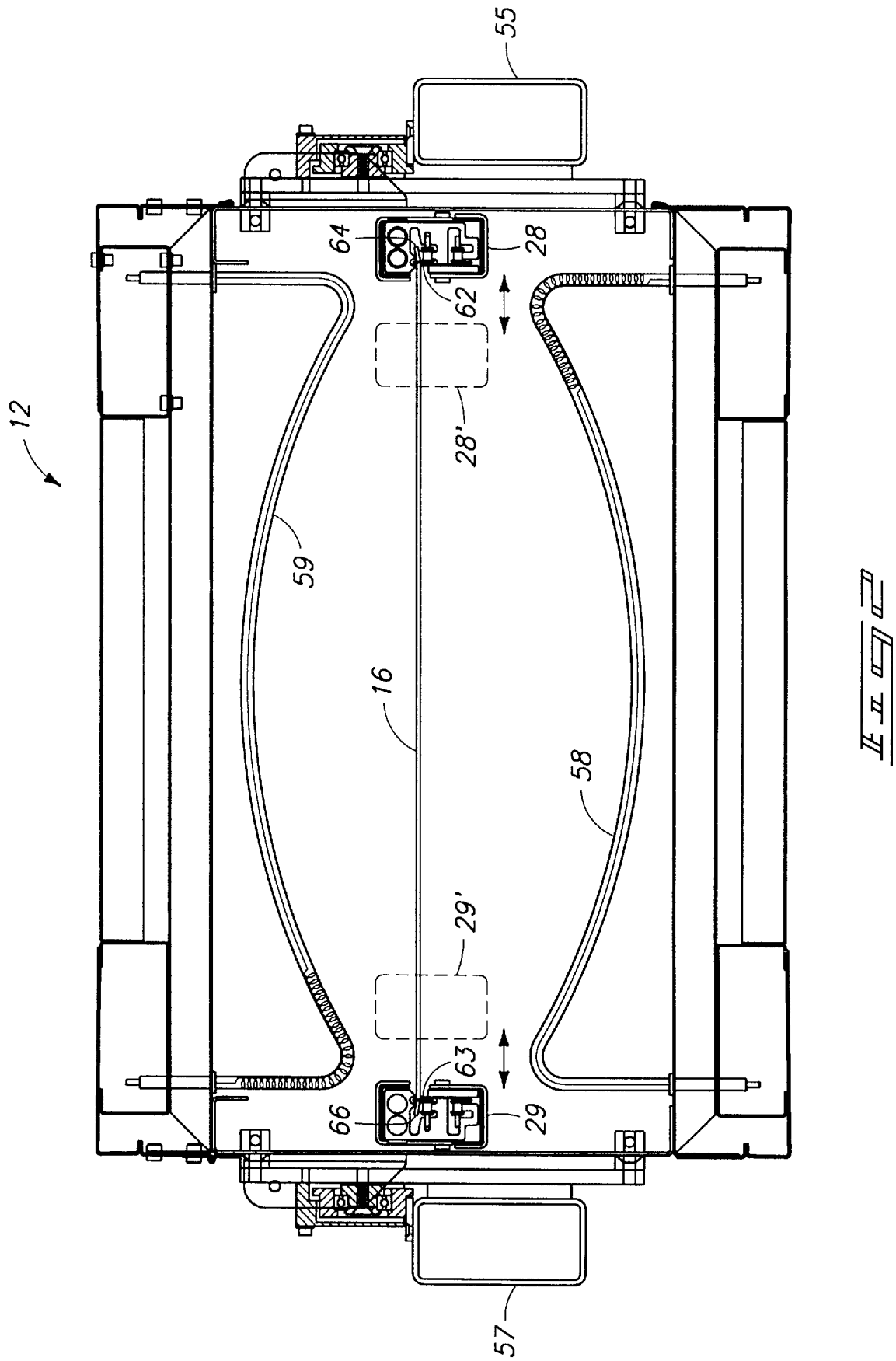
FIG. 2 is a vertical sectional view taken along line 2—2 of FIG. 1 illustrating adjustable positioning of spaced-apart conveyor rails on the conveyor as carried within the oven.

FIG. 2 illustrates the positioning of rails 28 and 29 as they extend longitudinally within oven 12. Rail 28 can be laterally positioned within oven 12 to various locations such as the position of rail 28'. Likewise, rail 29 can be laterally positioned within oven 12 to various locations such as the position of rail 29'. Optionally, only one of rails 28 and 29 might be provided with the laterally adjustable positioning features of this invention. Such an alternative construction would produce a similar result, but with a reduction in overall machine complexity and cost. However, when conveyor 10 is adjusted, web 16 would not necessarily be centered within oven 12 which could result in a less desirable non-uniform heating of web 16.

As shown in FIG. 2, web 16 is delivered through oven 12 along right edge 64 via frame rail 28, and along left edge 66 via frame rail 29. A right conveyor chain 62 perforates web 16 adjacent edge 64, with chain 62 remaining engaged with web 16 as it delivers web 16 along rail 28. Similarly, a left conveyor chain 63 perforates web 16 adjacent edge 66, with chain 63 remaining engaged with web 16 as it delivers web 16 along rail 29. Rails 28 and 29 are shown adjusted within oven 12 at a laterally positioned maximum spaced-apart distance. A laterally inwardly adjusted position of rails 28' and 29' is also shown within oven 12, with the device of this invention being able to adjustably position rails 28 and 29 at nearly any lateral location within oven 12.

According to the construction of this invention illustrated in FIG. 2, web 16 can be supported within oven 12 so that web 16 remains centered within oven 12 regardless of the width of web 16. By evenly adjusting the positions of rails 28 and 29, web 16 can be delivered centrally within oven 12. Such a result can be desirous especially since a typical oven has an array of individual heating coils 58 and 59 that are positioned and sized to substantially uniformly heat web 16 within oven 12. Off-center positioning of web 16, in some cases, might impart uneven heating to web 16, resulting in undesirable thermo-forming characteristics of web 16. A pair of right and left stationary support rails 55 and 57 are shown in FIG. 2 for supporting the various telescoping portions of oven 12. Each portion of oven 12 is preferably supported for axial movement along rails 55 and 57 by a plurality of guide wheels. Rails 55 and 57 form a support frame that positions and supports oven 12 about web 16. Rails 55 and 57 have been omitted from view in FIG. 1 since their particular construction is not important to the implementation of this invention.

Figure 3:
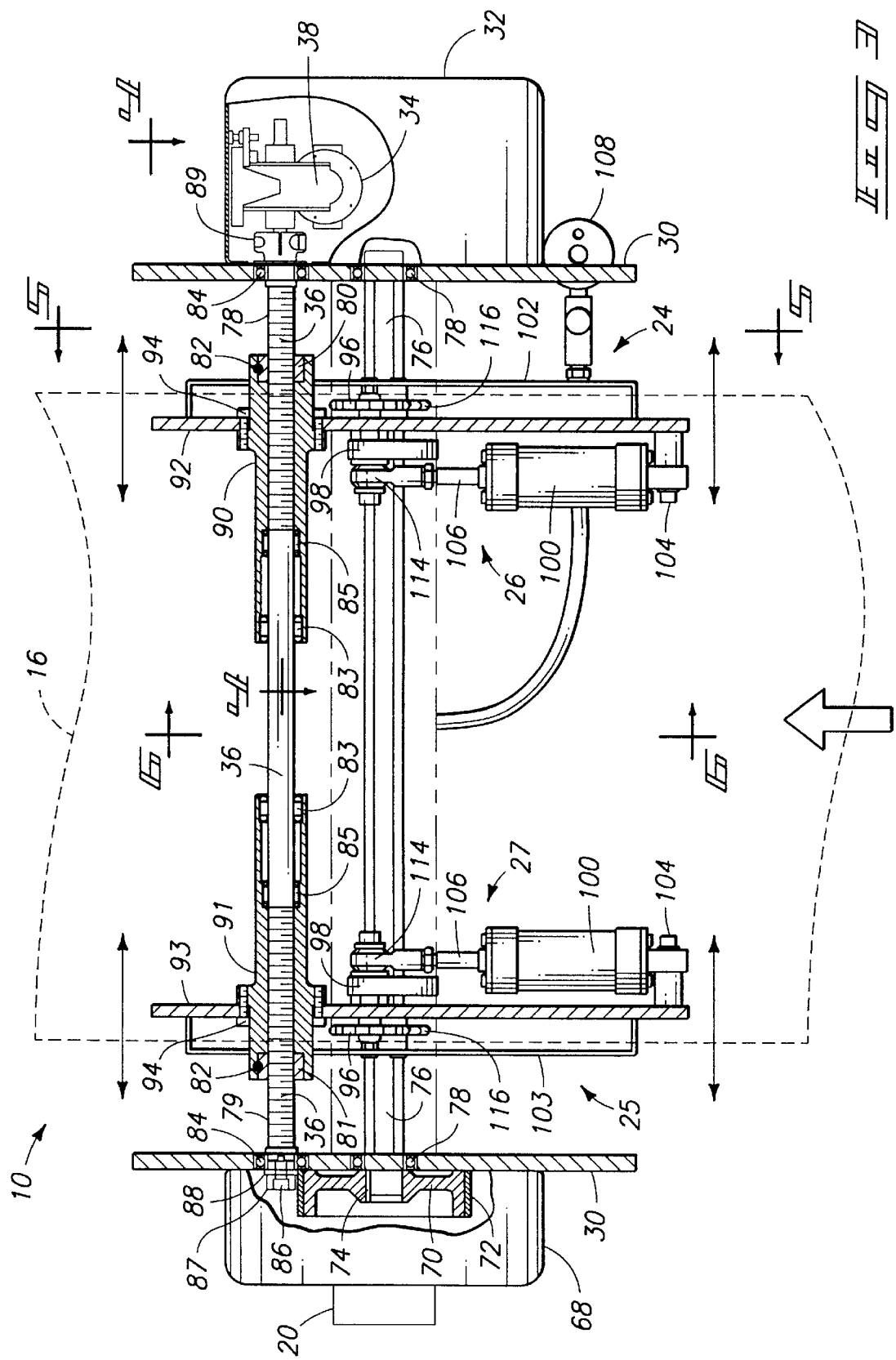
FIG. 3 is a partial breakaway plan view of the adjustable conveyor of FIG. 1 illustrating chain tensioning and rail adjustment features (but with the rails omitted) for tensioning chain tracks in each rail and for laterally positioning the rails to carry a web of material through the oven and former.

FIG. 3 depicts conveyor 10 in a partial breakaway plan view illustrating chain tensioning and rail adjustment features of this invention, but with the section taken below rails 28 and 29 (not shown), for tensioning conveyor chains 62 and 63 (not shown) in each rail and for laterally positioning the rails to carry a web 16 of material through the oven and former. More particularly, a right and a left chain drive assembly 24 and 25 drive the right and left conveyor chains (not shown), respectively, via a single, common hexagonal drive shaft 76. Each chain drive assembly 24 and 25 includes a drive gear 116 that is slidably received on hexagonal shaft 76 such that gear 116 is driven for rotation by shaft 76, yet can be adjustably positioned as drive assemblies 24 and 25 are laterally positioned with associated rails 28 and 29 (not shown) by servo drive motor 20. Additionally, each chain drive assembly 24 and 25 includes a right and a left chain tensioner assembly 26 and 27, respectively, for tensioning the right and left conveyor chains 62 and 63 (not shown), respectively. Accordingly, each chain is delivered around associated drive and delivery gears within each respective conveyor frame rail as will be discussed below with reference to FIGS. 4–8 and 14–20.

As shown in FIG. 3, chain drive assemblies 24 and 25 are each formed from an aluminum support sleeve 90 and 91, respectively, a support plate 92 and 93, respectively, and an associated cover shield 102 and 103, respectively. Each support sleeve 90 and 91 is mounted to the associated support plate 92 and 93, respectively, with a plurality of threaded fasteners 94. Associated covers 102 and 103 are affixed to support plates 92 and 93, respectively, via a plurality of fasteners (not shown), or by welding. Covers 102 and 103 serve to encase the associated conveyor chains (not shown) and gears 116 (and others not shown in FIG. 3) contained within chain drive assemblies 24 and 25, as well as tensioner gears 96 of chain tensioner assemblies 26 and 27.

A threaded drive shaft 36 is supported for rotation by frame 30 at either end via bearings 84, as shown in FIG. 3. Shaft 36 is threaded such that clockwise and counterclockwise rotation of shaft 36 laterally positions chain drive assemblies 24 and 25 and associated rails 28 and 29 (not shown) outwardly and inwardly, respectively. More particularly, shaft 36 has a clockwise threaded portion 78 along a right end and a counterclockwise threaded portion 79 along a left end. A complementarily threaded nut 80 is fixedly mounted within sleeve 90 where it is locked into position with a retaining pin 82. A similar complementarily threaded nut 81 is fixedly mounted within sleeve 91 where it is locked into position with a retaining pin 82. Clockwise rotation of shaft 36 will cause nuts 80 and 81 and associated sleeves 90 and 91, respectively, to move away from one another. Counterclockwise rotation of shaft 36 will cause nuts 80 and 81 and associated sleeves 90 and 91, respectively, to move toward one another. In this manner, the lateral positions of frame rails 28 and 29 (not shown) which are carried by sleeves 90 and 91, respectively, can be adjusted by rotation of shaft 36.

Preferably, a right end of shaft 36 has an end fitting 89 that removably connects with a drive shaft of a transfer case 38. Case 38 contains a set of transfer gears that enable linear screw motor 34 to drive shaft 36 for rotation in clockwise and counterclockwise directions. A left end of shaft 36 has a similar end fitting 87 forming a retaining shoulder 88 for securing the end of shaft 36 for supported rotation within bearing 84. A fastener 86 removably secures end fitting 87 to shaft 36.

Each of support sleeves 90 and 91 are constructed to support an inner and an outer array of needle bearings 83 and 85. Inner bearings 83 are preferably sized slightly larger than outer bearings 85. Bearings 83 and 85 form roller bearing contact surfaces for shaft 36 as it moves rotatably and axially through each of sleeves 90 and 91 during lateral adjustment of the frame rails. A remaining support portion of sleeves 90 and 91 for mating with shaft 36 is formed from nuts 80 and 81, respectively.

A single, common chain drive mechanism is provided by servo drive motor 20 which drives hexagonal shaft 76 for rotation via a toothed timing belt 72 and an associated toothed drive pulley 70. Belt 72 is driven by motor 20 via an associated drive pulley (not shown), imparting rotation to pulley 70 and shaft 76. Rotation of shaft 76 causes drive gears 116 to rotate which drives each of conveyor chains 62 and 63 to deliver web 16 along each edge via frame rails 28 and 29 (see FIG. 2). Pulley 70 is secured to shaft 76 with an anti-rotation key 74 received in an associated keyway. Shaft 76 has a cylindrical portion formed at each end that is received within a bearing 78 for supporting shaft 76 for rotation by frame 30. Pulley 70, belt 72, and a substantial portion of motor 20 are housed within a servo drive motor housing 68. 24

Also shown in FIG. 3, right and left chain tensioner assemblies 26 and 27 operate independently to tension each conveyor drive chain 62 and 63, respectively (see FIG. 2). More particularly, each chain tensioner assembly 26 and 27 has a drive cylinder 100 that is axially extendable via pneumatic and/or hydraulic fluid to extend extension rod 106. Rod 106 carries a mounting yoke 114 that rotatably connects with a top end of a tension arm 98. Yoke 114 and arm 98 are connected together along a common pivot axis with a freely rotating tension gear 96. Further details of yoke 114, arm 98 and gear 96 will be discussed below with reference to FIGS. 5–8. In operation, arm 98 is supported for rotation as is cylinder 100 which is also supported at an opposite end via a pivot mount 104. Extension of cylinder 100 causes gear 96 to be driven so as to tension an associated drive chain (not shown), causing the chain to be tensioned about associated travel/drive gears within the associated frame rail. A supply of air and/or hydraulic fluid is provided from a reservoir source 108 for supplying cylinders 100. Preferably, cylinders 100 are delivered with fluid at a preselected delivery pressure so as to tension each chain with a desired tension force.

Figure 4:
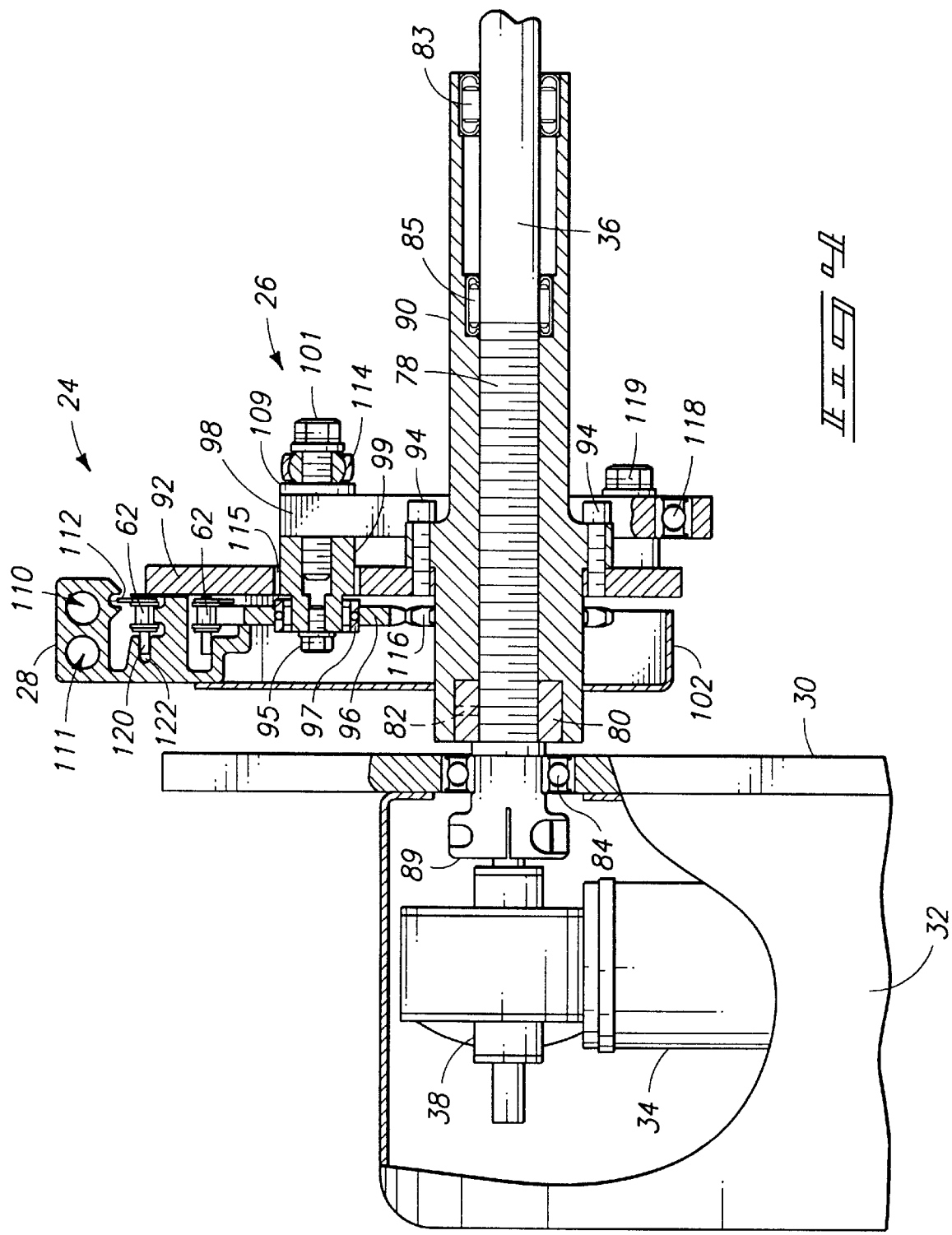
FIG. 4 is an enlarged partial vertical and breakaway sectional view taken along line 4—4 of FIG. 3 illustrating the chain drive sprocket assembly at the entrance end of the adjustable conveyor.

FIG. 4 illustrates the lateral adjustment features of right chain drive assembly 24 taken along vertical section 4—4 of FIG. 3. The vertical sectional view is taken substantially along the centerline of support sleeve 90, but shaft 36, fitting 89, transfer case 38 and motor 34 are shown in full view, with housing 32 shown in partial breakaway view to facilitate viewing of motor 34 and case 38 therein. More particularly, the placement of the array of needle bearings 83 and 85 can be seen within support sleeve 90. Nut 80 is retained within a recess of sleeve 90 by a retaining pin 82 that is received in a receiving bore formed cooperatively by a semi-circular groove provided on one face of nut 80 and a similar groove provided along an inner surface of sleeve 90, adjacent nut 80. Pin 82 is received in the bore, fixedly trapping nut 80 within sleeve 90. Part of chain 62 is not shown in order to facilitate viewing of gears 96 and 116.

FIG. 4 also illustrates the mounting of plate 92, shield 102, and rail 28 onto sleeve 90, with lateral movement of sleeve 92 causing corresponding lateral movement of rail 28. By providing needle bearings 83 and 85 spaced apart a substantial distance from nut 80, the axial alignment of rail 28 can be substantially maintained by retaining rail 28 in substantially perpendicular relation with shaft 36. Rail 28 is shown mounted to plate 92 with fasteners (not shown), with shield 102 being further mounted to rail 28. Rail 28 is shown to have a pair of cooling cavities 110 and 111 that cooperate to form a longitudinally extending cooling flow path extending along rail 28. One of cavities 110 and 111 supplies cooling fluid in one direction along rail 28, with the other of cavities 110 and 111 allowing the cooling fluid to return to the delivery source where it is then recycled through cavity 110. Cooling fluid cools rail 28 as it extends through a heating oven so that chain 62 will not overheat, which might otherwise cause fusing and deformation of a web being conveyed by chain 62. Chain 62 furthermore maintains stable guided support within rail 28 via a plurality of chain pins 120 that slide within a pin slot 122 of rail 28 along the delivery path of chain 62 so as to prevent twisting of chain 62 while under load. Additionally, pins 120 assist in guiding chain 62 along a return path of rail 28, immediately below the delivery path.

FIG. 4 also shows the manner in which tension gear 96 is supported to tension chain 62 via chain tensioner assembly 26 which pivotally supports gear 94 by tension arm 98 about a fixed pivot bolt 119. Extension of cylinder 100 (see FIGS. 3 and 6) causes gear 96 to be driven to tension chain 62, but guided by the pivotal motion of arm 98 so as to move gear 96 in a desired chain-tensioning direction. Gear 96 is supported for free rotation relative to arm 98 via a cylindrical bearing 97 that mounts gear 96 via a retaining fastener 95 to an offset shaft 99 that is carried by arm 98. Preferably, shaft 99 has a compound outer dimension, with a hexagonally-shaped portion extending through a slot 115 in plate 92. Bearing 97, arm 98 and assembly 114 receive cylindrical cross-sectional portions of shaft 99. Another threaded fastener 101 secures shaft 99 and an end of rotatable yoke assembly 114 with arm 98. Arm 98 and an end washer 109 are shown in full view, with adjacent portions shown in cross-sectional view. Cylindrical bearing 118 is shown at the opposite end of arm 98, with pivot bolt 119 retaining arm 98 for rotation about bolt 119 to plate 92.

As shown in FIG. 4, chain drive assembly 24 and rail 28 are positioned at a laterally outermost position, with nut 80 being brought adjacent frame 30. Additionally, end fitting 89 and bearing 84 cooperate with a cylindrical end portion of shaft 36 to support shaft 36 for rotation along frame 30 as motor 34 and transfer case 38 drive shaft 36 in rotation.

Figure 5:
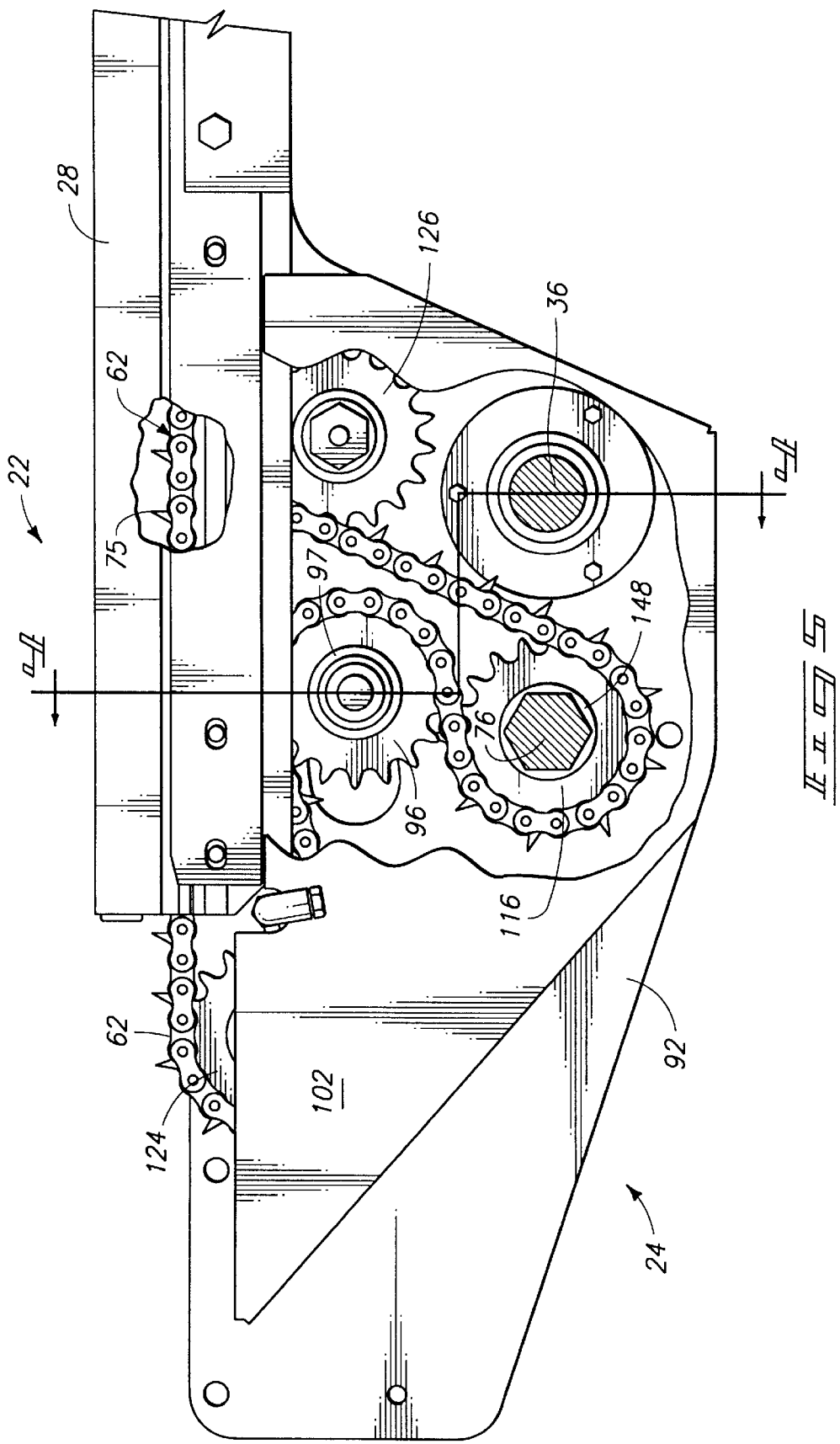
FIG. 5 is an enlarged partial vertical breakaway and sectional view taken along line 5—5 of FIG. 3 illustrating the air/hydraulic chain sprocket tensioner at the entrance end of the adjustable conveyor.

FIG. 5 depicts the right chain drive assembly 24 in enlarged partial vertical breakaway and sectional view taken along line 5—5 of FIG. 3. The left chain drive assembly is similarly constructed, but as a mirror image of assembly 24. The drive path of chain 62 is shown particularly with reference to hexagonal drive shaft 76 and gear 116, and tensioner gear 96. As shown in FIG. 5, gear 96 is driven in a rightward direction as cylinder 100 (see FIGS. 4 and 6) is supplied with working fluid, causing cylinder 100 to extend shaft 106 and push gear 96. Rightward movement of gear 96 imparts tension to chain 62 as it travels along the remaining gears of right chain track assembly 22. Chain 62 is delivered into rail 28 via a rotating feed sprocket gear 124 that guides chain 62 into a receiving track of rail 28. Teeth 75 of chain 62 perforate and engage a web that is fed along rail 28. Chain 62 is returned within rail 28 by a pair of turning and return sprocket gears 178 and 176 (see FIG. 15) where a proximate return sprocket gear 126 delivers chain 62 to drive gear 116. Preferably, sprocket gears 124, 126, 176 (see FIG. 15) and 178 (see FIG. 15) are supported to freely rotate as chain 62 is driven by drive gear 116, while under tension via gear 96. Chain 63 (see FIGS. 3 and 9) is similarly guided and driven within left chain track assembly 23.

Figure 6:
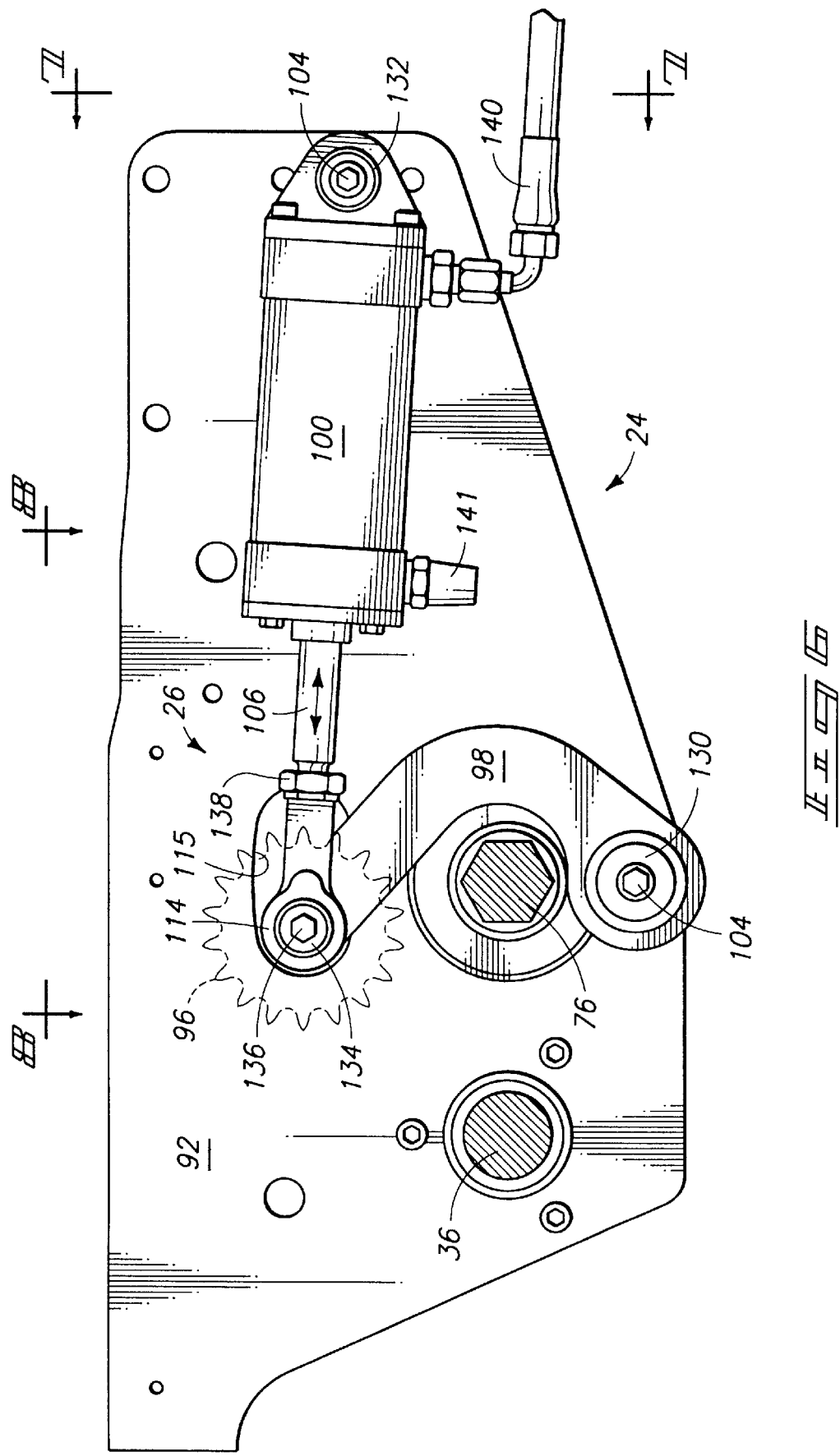
FIG. 6 is an enlarged partial vertical sectional view taken along line 6—6 of FIG. 3 illustrating the chain sprocket drive assembly and chain sprocket tensioner at the entrance end of the adjustable conveyor.

FIG. 6 illustrates the movable positioning of tension gear 96 of chain tensioning assembly 26 via axial extension of cylinder 100 when supplied by working fluid via feedline 140. Feedline 140 is in fluid communication with fluid source 108 via main feedline 156 (see FIG. 9). For example, introduction of pressurized gas into cylinder 100 will cause extensible piston rod 106 to extend, driving gear 96 forward so as to tension a chain travelling along gear 96. A threaded attachment nut 138 removably secures yoke 114 on the end of rod 106. Tension arm 98 is constructed with an arcuate shape so as to clear shaft 76, with arm 98 pivoting about mounting bolt 104 via cylindrical bearing 130 as rod 106 drives an opposite end of arm 98 to apply chain tension via gear 96. Yoke 114 is also pivotally mounted to arm 98 via bearing 134 and threaded fastener 136. Gear 96 is separately pivotally mounted to arm 98 via offset shaft 99 (see FIGS. 7 and 8 below). An outlet feedline fitting 141 is also shown for optionally supplying a supply of fluid for retracting rod 106 and gear 96. Optionally, fitting 141 serves as a bleed port for ejecting gas from within cylinder 100, along a piston side opposite the side being driven by working fluid from feedline 140. Drive shaft 36 is also shown extending, or passing, through plate 92.

Figure 7:
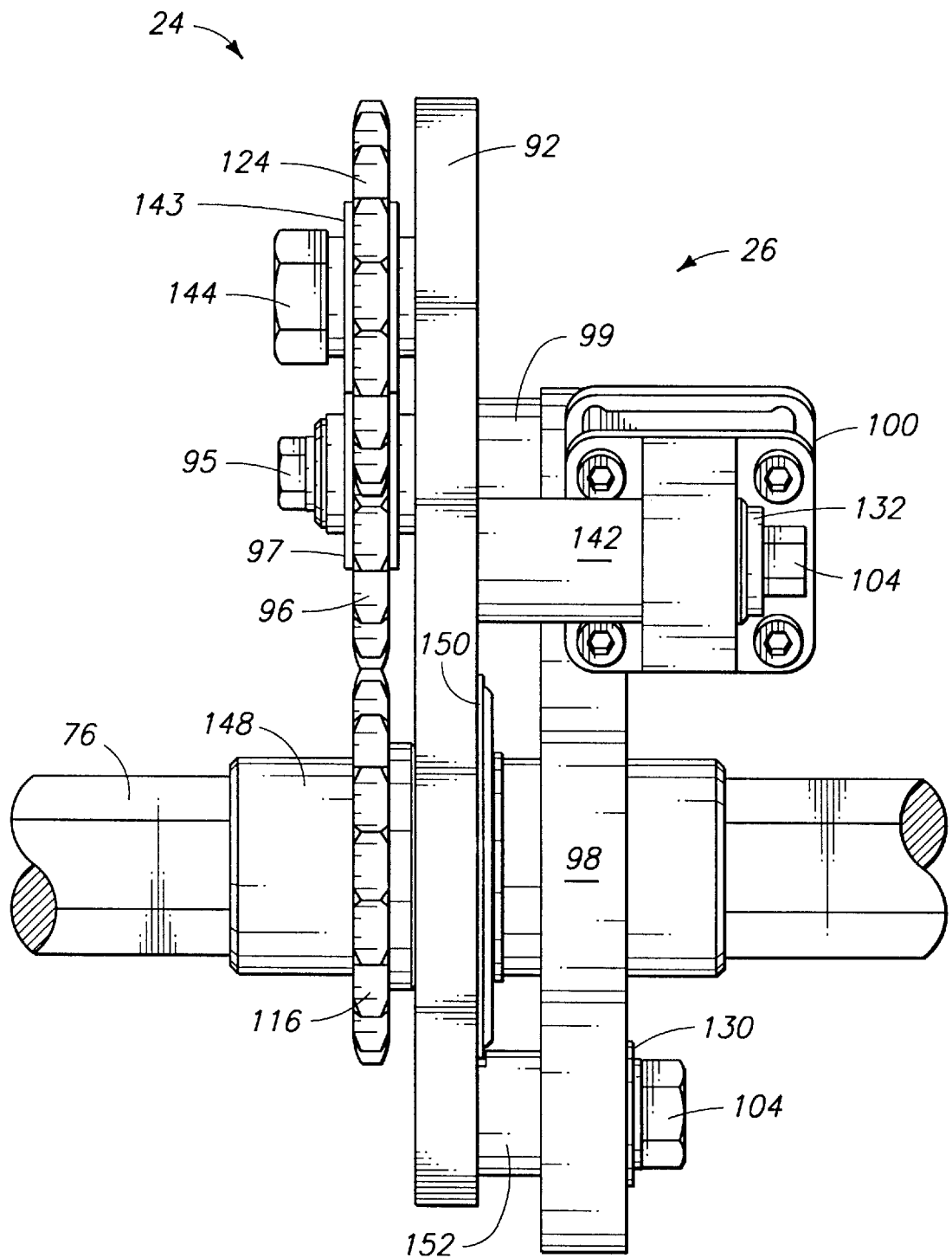
FIG. 7 is an enlarged partial vertical sectional view taken along line 7—7 of FIG. 6 illustrating the conveyor chain tensioner in end view.

FIG. 7 illustrates right chain tensioner assembly 26 of right chain drive assembly 24 with shield 102 (see FIG. 5) removed to facilitate viewing of gears 96, 116 and 124. Chain 62 has also been omitted from FIGS. 7 and 8 in order to further facilitate viewing of the gears. Tensioner assembly 26 is shown in enlarged partial vertical sectional view taken along line 7—7 of FIG. 6 illustrating the conveyor chain tensioner in end view. Feed sprocket gear 124 is shown supported for free rotation on plate 92 via a cylindrical bearing 143 and a threaded fastener 144. Fastener 144 secures bearing 143 and sprocket gear 124 for rotation on plate 92. Tension gear 96 is similarly shown supported via bearing 97 and fastener 95 by offset shaft 99. Cylinder 100 tensions gear 96 responsive to actuation of cylinder 100. A fixed end of cylinder 100 is retained for rotation via bearing 132 and pivot mount fastener 104 to plate 92 with an offset support post 142. Likewise, a fixed end of arm 98 is mounted to plate 92 via pivot mount fastener 104, cylindrical bearing 130, and offset post 152.

FIG. 7 also illustrates the axially slidable mounting of drive gear 116 and plate 92 (and remaining depending gears) along hexagonal drive shaft 76. Gear 116 is securely mounted onto a cylindrical collar 148 that has an inner hexagonal through-aperture corresponding with the outer surface of shaft 76. Gear 116 is fixed to collar 148 so as to prevent rotation of gear 116 relative to shaft 76. Collar 148 is also rotatably secured to plate 92 via a cylindrical bearing 150. Hence, as plate 92 is laterally positioned by the rotation of shaft 76 by action of the lateral rail adjustment features described with reference to FIGS. 3 and 4, collar 148 slides axially along shaft 76 while remaining in rotatably fixed relation with shaft 76 via associated hexagonal interfitting surfaces.

Figure 8:
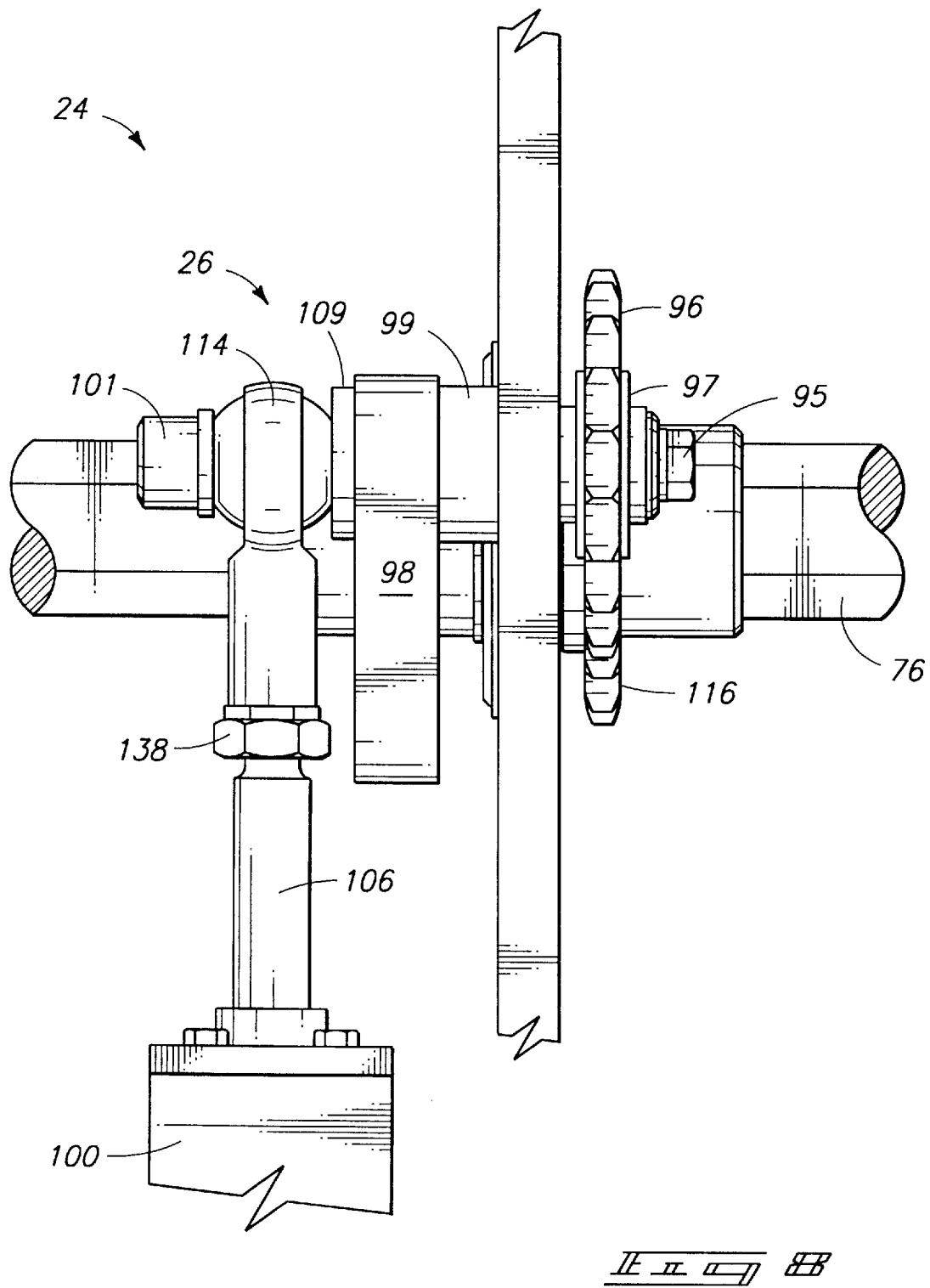
FIG. 8 is an enlarged partial vertical sectional view taken along line 8—8 of FIG. 6 illustrating the chain sprocket drive assembly and chain sprocket tensioner.

FIG. 8 shows right chain tensioner assembly 26 of right chain drive assembly 24 in enlarged partial vertical sectional view taken along line 8—8 of FIG. 6. According to this view, the provision of forward movement of gear 96 to tension a chain carried along the gear can be readily seen, as rod 106 is axially extended by axial actuation of cylinder 100. Yoke 114 pivotally attaches rod 106 to fastener 101, arm 98, shaft 99 and gear 96. Furthermore, gear 96 is separately pivotally mounted for rotation to shaft 99 via bearing 97 and mounting fastener 95. The arcuate shape of arm 98 can be seen extending with clearance around hexagonal shaft 76 in this view.

Figure 9:
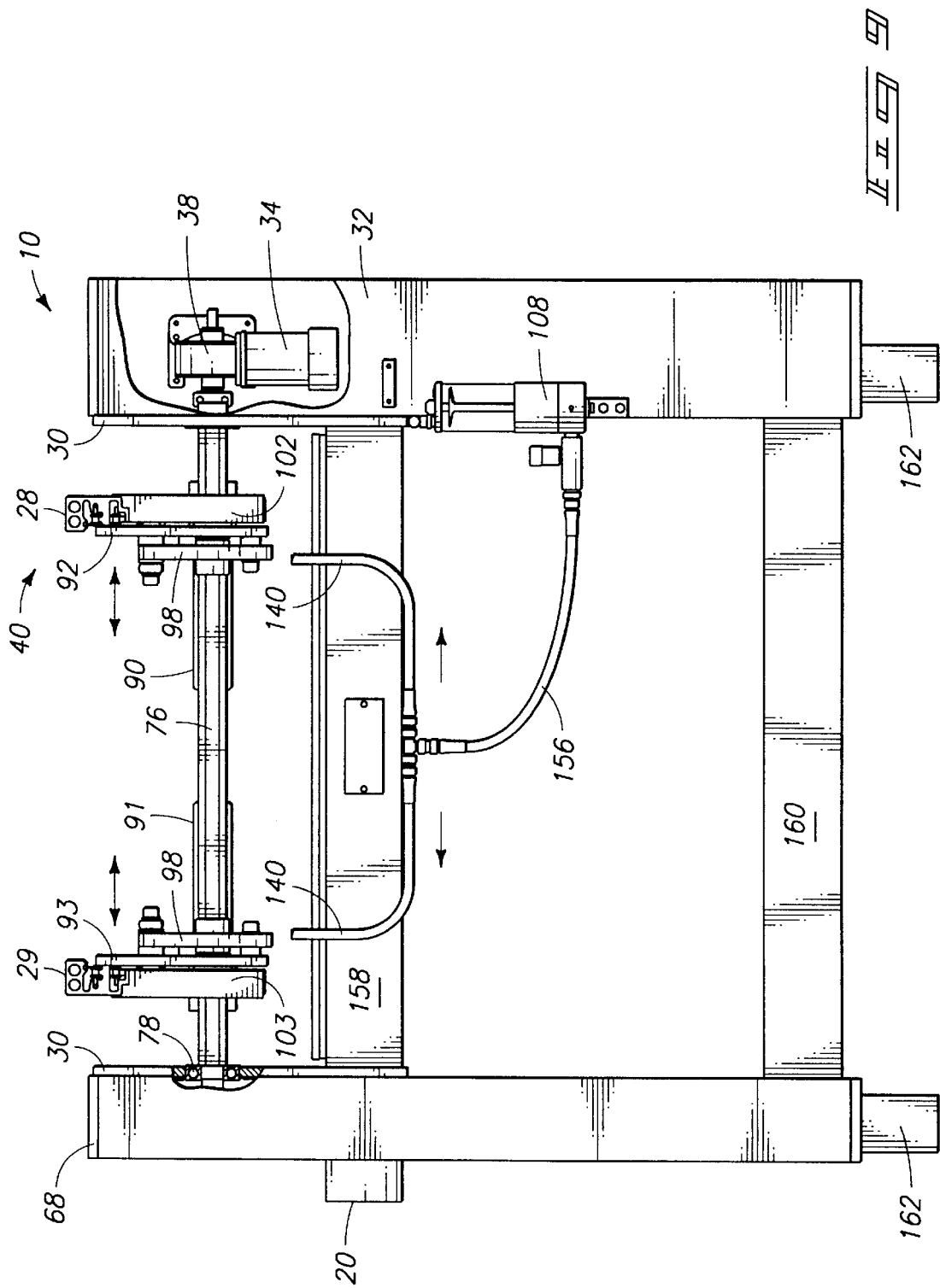
FIG. 9 is a vertical end view of the entrance end of the conveyor.

FIG. 9 a vertical end view of entrance end 40 of conveyor 10 illustrating further the laterally adjustable positioning of elongated frame rails 28 and 29 relative to frame 30. Motor 20 drives the conveyor chains of rails 28 and 29 via rotation of pulley 70 and belt 72 (see FIG. 3), contained within housing 68, and hexagonal drive shaft 76. Screw drive motor 34 drives threaded shaft 36 (see FIG. 3), hidden from view behind shaft 76, through transfer case 38 for laterally adjusting the relative positions of rails 28 and 29. The fluid communicating assembly of fluid feedlines 140 and 156 with fluid source 108 is also shown. Each of feedlines 140 (shown in partial breakaway) provides a source of working fluid to one of cylinders 100 (see FIG. 3) for tensioning the respective conveyor drive chains of rails 28 and 29. Frame 30 is also shown in further detail as having an upper and a lower cross support member 158 and 160 that each extend between housings 32 and 68 to provide support and rigidity to the frame.

Figure 10:
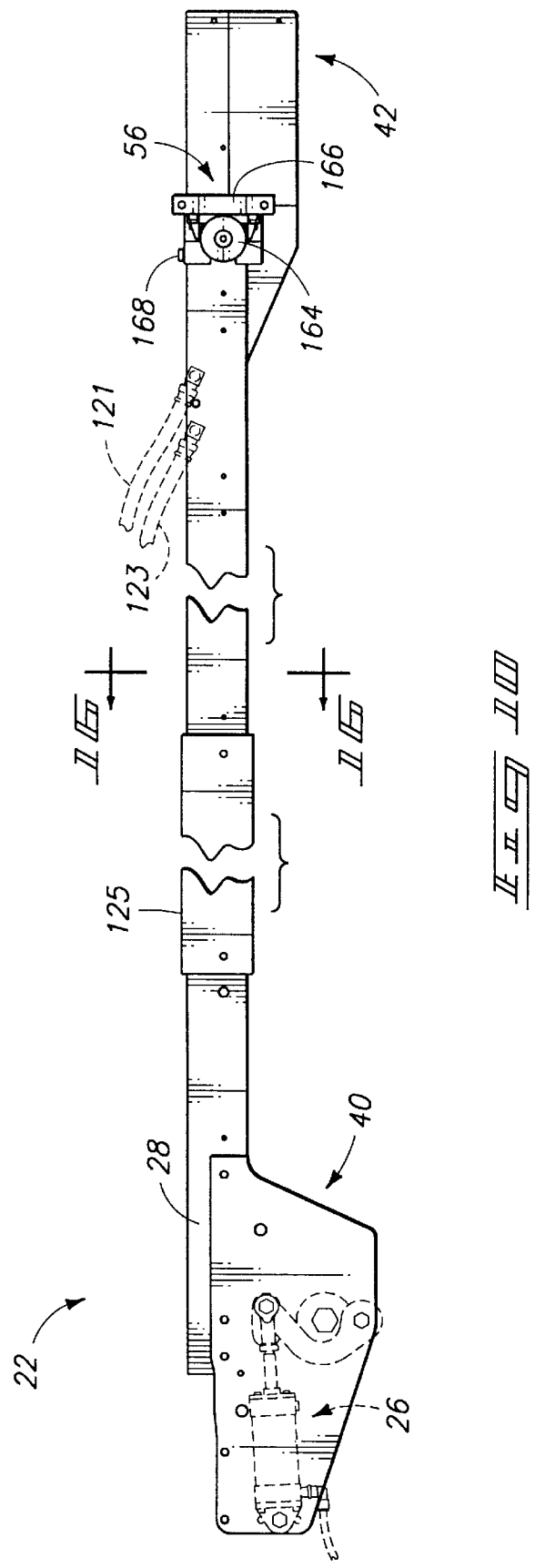
FIG. 10 is an enlarged vertical side view of the right chain track assembly of FIG. 1 illustrating the right chain rail, but with portions removed to facilitate viewing, the right chain tensioner assembly, and the rear support rail assembly.

FIG. 10 is an enlarged vertical side view of the right chain track assembly 22 of FIG. 1 illustrating right chain rail 28, right chain tensioner assembly 26, and rear support rail assembly 56. Portions of the right chain rail 28 have been removed to shorten the rail and facilitate viewing. Chain tensioner assembly 26 is shown supported along entrance end 40 of track assembly 22 for tensioning an associated conveyor drive chain (not shown). A rear support rail assembly 56 is also shown supported along exit end 42 of track assembly 22 for supporting elongate rail 28 in any of a number of laterally adjustable positions by a support frame such as former frame 165 (see FIG. 11). Additionally, an elongate metal heat shield 125 encases rail 28 where it extends through heat oven 12 (see FIG. 1).

Heat shield 125 of FIG. 10 forms a protective heat sink around rail 28. Application of heat from an oven to shield 125 is drawn away, or removed, via a flow of cooling fluid delivered through rail 28. Cooling fluid is delivered via inlet conduit 121 and exit conduit 123 which supply a flow of cooling fluid through cooling cavities 110 and 111, respectively, within rail 28. Rail 29 is similarly constructed.

Rear support rail assembly 56 of FIG. 10 includes a bearing mount 166 that is secured to a support frame such as frame 165 (see FIG. 11). Preferably, an adjustment bolt 168 enables an operator to secure the lateral position of rail 28 along exit end 42 to a support frame 165 (of FIG. 11). Accordingly, an operator will first release fastener 168 (and fastener 168 of support rail assembly 54 of FIG. 11) on each of rails 28 and 29, prior to adjustably positioning rails 28 and 29 via the lateral adjustment features described with reference to FIGS. 3 and 4. Subsequently, fasteners 168 are tightened to lock the positioning of rails 28 and 29 along exit end 42. Preferably, handles 164 facilitate accurate lateral positioning of the exit end of rails 28 and 29 by an operator prior to the tightening of fasteners 168. In this manner, an operator can accurately position the upstream end of rails 28 and 29 via motor 34 (of FIGS. 3 and 4) which also substantially positions the downstream ends, then accurately measure the resulting positioning of the downstream, or exit, ends of rails 28 and 29, prior to tightening of the fasteners 168 which secure rails 28 and 29 precisely along the exit end 42.

FIG. 11 illustrates in enlarged vertical side view the exit end 42 of conveyor 10. Rail 28 is supported along exit end 42 by front support rail assembly 54 and rear support rail assembly 56 with frame 165 of former 14. Rail 29 (of FIG. 9) is similarly supported by frame 156 via similar assemblies 54 and 56. Associated kinematic drive linkages and die platens have been omitted from former 14 since their construction is not important to the support and operation of conveyor 10. Each of assemblies 54 and 56 has a bearing block mount 166 that is secured to frame 165, with an adjustor bolt 163 positioned between mount 166 and frame 165 to enable adjustable canting of mount 166 relative to frame 165 for aligning each assembly 54 and 56 with the mounting structure of rail 28. Handle 164 and support rail 167 (see FIGS. 12 and 13) are fixedly mounted to rail 28 by a chain track mounting member 172.

Member 172 of FIG. 11 has elongated slots, or holes, 173 for receiving mounting fasteners 174 when fixedly mounting rail 28 with member 172. Fasteners 174 have a shoulder sized to retain member 172 securely to rail 28, yet enable sliding of fastener 174 along slot 173 to allow for expansion and contraction of rail 28 relative to member 172 due to thermal heating and cooling resulting from heat applied to rail 28 from over 12 (see FIG. 1). Fastener 168 on each of assemblies 54 and 56 releasably secures support rail 167 between upper and lower clamp members 170 and 171 on mount 166. Additionally, adjustable levelling legs 162 enable alignment of rails 28 and 29 (of FIG. 9) with assemblies 54 and 56 on frame 165. In this manner, an operator can tighten and loosen support rail assemblies 54 and 56 with frame 165 when adjustably affixing chain rails 28 and 29 to former 14. However, especially where rails 28 and 29 are relatively short, fasteners 168 are not necessary to maintain a desired spaced-apart positioning of rails 28 and 29.

Assemblies 54 and 56 also enable an operator to position and secure rails 28 and 29 along the exit end 42 of the conveyor so as to impart a wider or a narrower lateral positioning of rails 28 and 29 than is imparted at the entrance end 40 (of FIG. 1) by motor 34. Such tapering, non-parallel positioning of rails 28 and 29 relative to one another is sometimes desirable when delivering a web of material that stretches and narrows in width during heating in oven 12 and delivery along rails 28 and 29 of conveyor 10. Likewise, some materials might expand laterally during delivery along conveyor 10, making it desirable to widen the distance between rails 28 and 29 toward the exit end 42. An operator can measure and secure the exit end positioning of rails 28 and 29, following positioning of the entrance end via motor 34 (of FIG. 1), by positioning rails 28 and 29 via handles 164, while fasteners 168 are loosened, then tightening fasteners 168 to fix the positioning of rails 28 and 29 along exit end 42 at desired spaced-apart locations.

Figure 12:
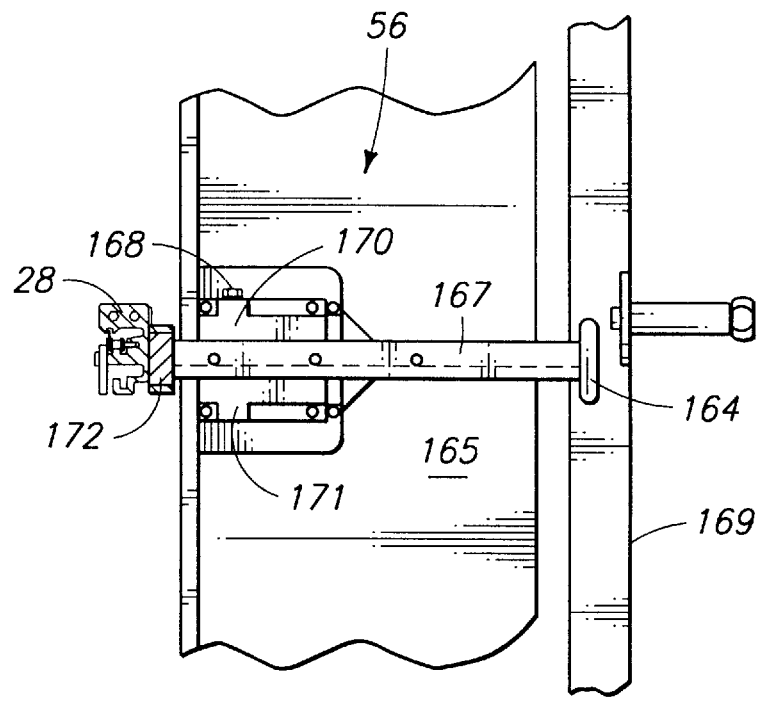
FIG. 12 is an enlarged breakaway and partial vertical sectional view of the right rear support rail assembly for adjustably affixing the right rail to the former.

FIG. 12 is an enlarged breakaway and partial vertical sectional view of right rear support rail assembly 56 as mounted to frame 165 for adjustably affixing right rail 28 to the former. Handle 164 is shown securely mounted to an end of support rail 167. Rail 167 is formed from a L-shaped piece of angle metal. A lower horizontal edge of rail 167 is received between upper and lower clamping members 170 and 171 where it is securely clamped by tightening fastener 168 so as to draw members 170 and 171 together. Rail 167 is preferably welded to chain track mounting member 172 along an end opposite from handle 164. Rail 28 is removably mounted to member 172 and rail 167 via fasteners such that lateral positioning of handle 164 and rail 167 manipulates the lateral positioning of rail 28 within frame 165.

Figure 13:
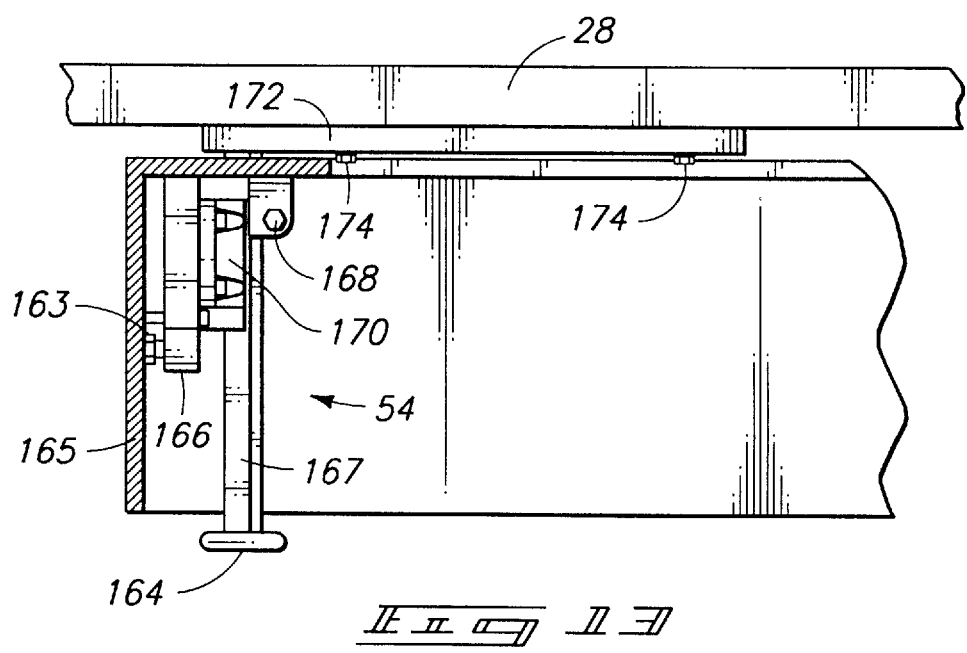
FIG. 13 is an enlarged breakaway and partial horizontal sectional view illustrating the right front support rail assembly for adjustably affixing the right rail to the former.

FIG. 13 further illustrates right front support rail assembly 54 as seen in an enlarged breakaway and partial horizontal sectional view showing the adjustable positioning of right rail 28 relative to frame 165 of the former. Bearing block mount 166 is preferably secured along an inner edge with frame 165, adjacent rail 28 and member 172. An outer edge of mount 166 is adjustably positioned relative to a side flange of frame 165 so as to cant, or angularly adjust, bearing block mount 166 relative to frame 165 so as to facilitate alignment of clamping members 170 and 171 in substantially parallel, or aligned, relation with support rail 167. Preferably, upper clamping member 170 is securely mounted to mount 166, with lower clamping member 171 (of FIG. 12) being vertically movably mounted to clamping member 170 via threaded adjustment bolt 168. Tightening of bolt 168 draws clamping members 170 and 171 together to secure rail 167 therebetween. Loosening of bolt 168 enables separation of members 170 and 171 and axial sliding of rail 167 therebetween.

FIG. 13 also depicts the relative positioning of fasteners 174 for securing rail 28 to mounting member 172. Changes in the length of rail 28 caused by heating and cooling of rail 28 are accommodated by relative movement of fasteners 174 along member 172 via slots 173 (of FIG. 11).

FIG. 14 is an enlarged partial and breakaway view of the entrance end 40 of right chain rail 28, but with the right chain drive and tensioner assemblies removed. Right conveyor chain 62 is shown positioned within rail 28 where it is delivered along a delivery path and a return path. Teeth 75 on chain 62 are positioned and shaped to perforate a web being delivered along rail 28, forming an interdigitating engagement between chain 62 and the web that is suitable for conveying the web along rail 28. Rail 29 (of FIG. 9) has a similar chain that is constructed as a mirror image of chain 62.

FIG. 15 is an enlarged partial and breakaway view of exit end 42 of right chain rail 28 illustrating the placement of a distal return sprocket gear 176 and a turning sprocket gear 178 supported for free rotation by rail 28. Chain 62 is tensioned around gear 178 extending from a delivery direction to a return direction. Gear 176 further supports chain 62 for return delivery within rail 28.

Figure 16:
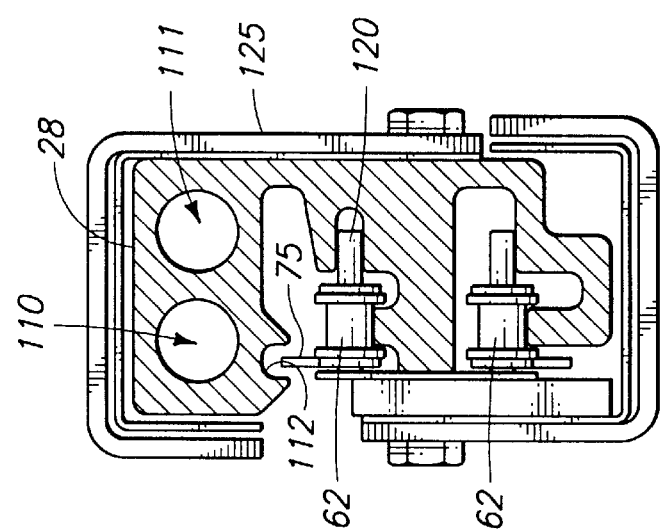
FIG. 16 is a vertical sectional view of the right chain rail taken along line 16—16 of FIG. 10.

FIG. 16 is a vertical sectional view of right chain rail 28 taken along line 16—16 of FIG. 10 illustrating the positioning of chain 62 within rail 28 adjacent to heat shield 125. Teeth 75 are presented for travel along a guide groove 112 of rail 28 to ensure perforation and engagement with a web being delivered along rail 28 by chain 62. Pins 120 guide chain 62 such that teeth 75 remain centered along groove 112 when chain 62 is delivered along a delivery path of rail 28.

Figure 17:
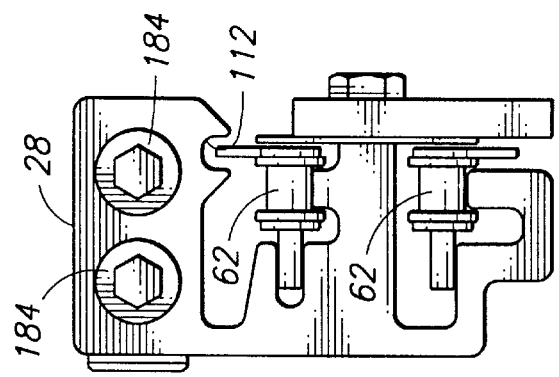
FIG. 17 is an entrance end view of the right chain rail taken along line 17—17 of FIG. 14.

FIG. 17 is an entrance end view of right chain rail 28 taken along line 17—17 of FIG. 14 and illustrating chain 62 where it exits rail 28 along an upper delivery path and a lower return path. Chain 62 exits the upper path where it is received over gear 124, as shown in FIG. 5. Gear 126 (of FIG. 5) guides chain 62 for return to rail 28 along the lower return path. Plugs 184 are threaded into the ends of cavities 110 and 112 (of FIG. 16) to seal cavities 110 and 112.

Figure 18:
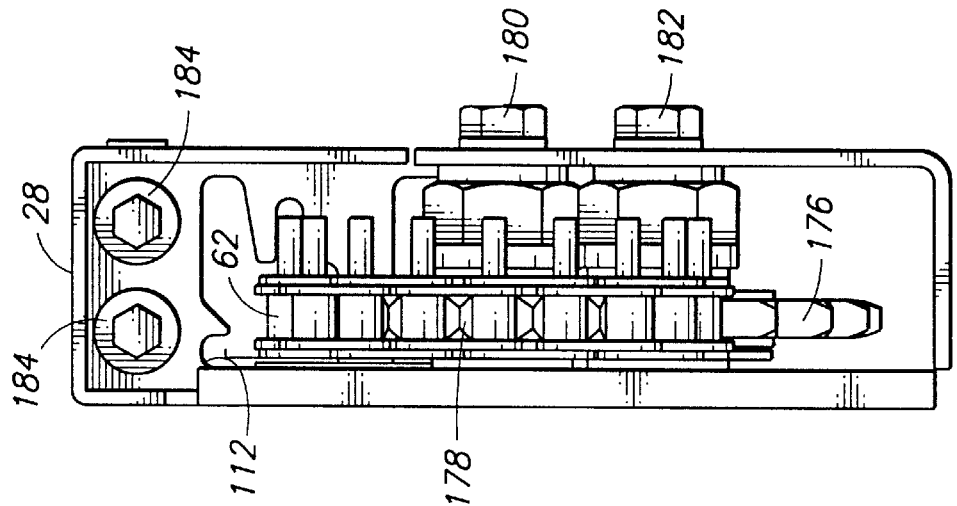
FIG. 18 is an exit end view of the right chain rail taken along line 18—18 of FIG. 14.

FIG. 18 is an exit end view of right chain rail 28 taken along line 18—18 of FIG. 15 and illustrating chain 62 as received about distal return sprocket gear 176 and turning sprocket gear 178. A threaded fastener 180 and 182 mounts gears 178 and 176, via associated cylindrical bearings, respectively, to frame 28. In this manner, gears 176 and 178 are mounted in rotatable relation with frame 28 for turning and guiding chain 62 from an upper chain delivery path to a lower return path within rail 28. Rail 29 (see FIG. 9) is similarly constructed.

Figure 19:
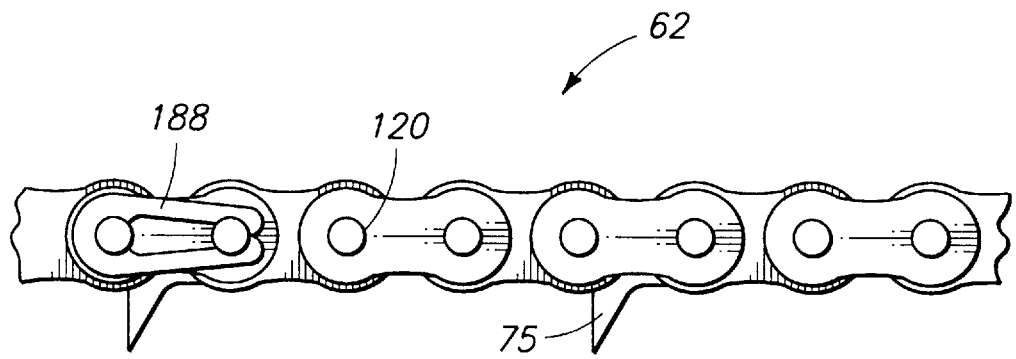
FIG. 19 is a vertical side view of one suitable chain for use in the adjustable conveyor illustrating the orientation of the right conveyor chain as it is returned within the right chain rail from the exit end to the entrance end.

FIG. 19 is a vertical side view of one suitable chain 62 for use in the right rail of adjustable conveyor of FIGS. 1—18. An identical, but mirror image chain is used for the left rail of the conveyor. Right conveyor chain 62 is shown as delivered in the lower return path of the right rail, with teeth 75 extending in a downward direction. Pins 120, as shown in FIG. 19, remain substantially flush with chain 62, holding adjacent links of chain 62 together. A removable clip 188 provided on each side of chain 62 enables removal and maintenance of chain 62 from the conveyor.

Figure 20:
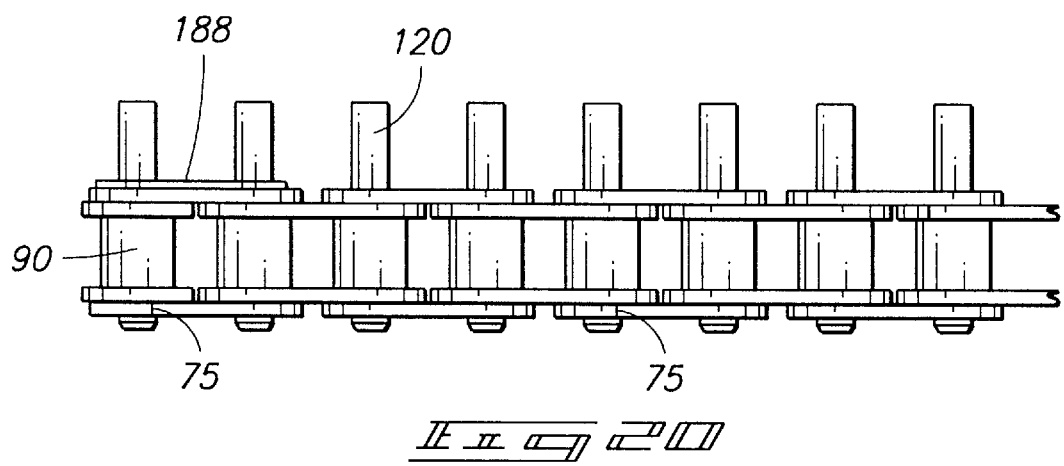
FIG. 20 is a plan view of the right conveyor chain of FIG. 19 illustrating the orientation of the one suitable chain as it is returned within the right chain rail from the exit end to the entrance end.

FIG. 20 is a plan view of right conveyor chain 62 of FIG. 19 illustrating chain 62 is plan view. Pins 120 can be seen extending from the back side of chain 120 where they support and guide chain 62 as it travels through the right rail. Barrel bodies 90 rotatably mount about each pin 120 to form a rotatable engaging contact for mating with each associated gear of the conveyor. Alternatively, any of a number of chain constructions can be used to deliver a web along the conveyor. Even further alternatively, any of a number of conveyance devices can be provided on the conveyor for delivering a web along the laterally adjustable rails, including frictionally engaging drive wheels, gears, pulley, belts, frictional delivery devices, etc.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

I claim:

1. A web handling apparatus for delivering thin web materials, comprising:

a support frame;

a pair of laterally spaced-apart and substantially longitudinally extending frame rails carried by the support frame and positioned to support a web of material delivered therebetween;

a support rail affixed outwardly of each frame rail adjacent an exit end, the support rails configured to support the pair of frame rails from the support frame wherein unobstructed access between the frame rails is provided from the exit end; and an adjustment mechanism positioned to adjust relative positioning of the pair of frame rails in spaced-apart relation.

2. The apparatus of claim 1 wherein the adjustment mechanism is coupled to at least one of the frame rails for laterally adjusting spaced-apart positioning of the frame rails.

3. The apparatus of claim 2 wherein the adjustment mechanism operatively couples the frame rails for adjustable movement in a direction substantially lateral of the substantially longitudinally extending frame rails.

4. The apparatus of claim 1 wherein the adjustment mechanism comprises a linear screw drive assembly extending between and interconnecting the frame rails.

5. The apparatus of claim 4 wherein the linear screw drive assembly comprises a screw drive shaft extending between the frame rails, a threaded sleeve member coupled to each frame rail, and a linear screw drive motor for rotatably driving the drive shaft, each threaded sleeve member coupled for threaded engagement with the drive shaft such that rotation of the drive shaft in one of a clockwise and a counterclockwise direction moves the frame rails apart, and rotation in the other direction moves the frame rails together.

6. The apparatus of claim 5 wherein the linear screw drive assembly comprises a drive train for coupling the drive shaft with the drive motor.

7. The apparatus of claim 1 wherein at least one of the frame rails comprises a chain track assembly.

8. The apparatus of claim 7 further comprising a conveyor chain carried by the at least one frame rail having a plurality of teeth arranged to engage the web, the conveyor chain carried for movement along the frame rail so as to move the engaged web there along.

9. The apparatus of claim 7 wherein the frame rail further comprises a cooling circuit in the form of at least one cooling cavity disposed within the frame rail, cooling fluid being received within the cooling cavity for cooling the frame rail.

10. The apparatus of claim 7 wherein the chain track assembly includes a conveyor chain supported for movement by one of the frame rails and a chain drive assembly carried by one of the frame rails and configured to move the conveyor chain in engagement with the web longitudinally there along.

11. The apparatus of claim 10 wherein the chain track assembly further comprises a chain tensioner assembly carried by at least one frame rail and configured to tension the chain for movement along the frame rail.

12. The apparatus of claim 11 wherein the chain tensioner assembly comprises a tensioner gear and a tensioner cylinder, the tensioner cylinder operatively coupled to the tensioner gear for tensioning the conveyor chain extending along one of the frame rails.

13. The apparatus of claim 1 wherein the support frame comprises a first support frame for supporting an entrance end of the frame rails.

14. The apparatus of claim 13 wherein the support frame further comprises a second support frame for supporting an exit end of the frame rails.

15. The apparatus of claim 14 wherein the second support frame comprises a frame of a thermo-forming machine provided outwardly of each frame rail and configured to support exit ends of the frame rails in laterally adjustable locations by movably supporting each respective support rail associated with one of the frame rails.

16. The apparatus of claim 14 further comprising at least one support rail assembly formed at least in part by the support rail and coupled to each of the frame rails and supported by the second support frame for adjustably positioning the frame rails one to the other.

17. The apparatus of claim 16 wherein each support rail assembly comprises the support rail coupled to one of the frame rails and mounted for movement laterally of the frame rail, and further comprises a bearing mount carried by the second support frame for supporting the support rail and the frame rail.

18. The apparatus of claim 17 wherein the support rail assembly further comprises a mounting member coupled with the frame rail, the support rail affixed to the mounting member.

19. The apparatus of claim 17 wherein the bearing mount comprises a pair of clamping members carried by the support frame and having an adjustment bolt configured to releasably clamp the support rail within the bearing mount.

20. The apparatus of claim 1 further comprising a support rail assembly including a support rail coupled to each of the frame rails and supported by the support frame for adjustably positioning the frame rails one to the other.

21. The apparatus of claim 20 wherein the support rail assembly releasably secures the pair of frame rails in laterally spaced-apart relation.

22. The apparatus of claim 20 wherein the support frame comprises a frame of a thermo-forming machine, and wherein a pair of support rail assemblies are provided in part by each support rail, each support rail assembly configured to movably support one of the frame rails for lateral movement with respect to the thermo-forming machine frame.

23. A conveyor frame for edge supporting thin web materials, comprising:

a first guide rail constructed and arranged to receive and deliver a first edge of a web of material to be conveyed;

a second guide rail laterally spaced apart from the first guide rail and constructed and arranged to receive and deliver a second opposite edge of the web of material to be conveyed;

an extensible cross-member assembly affixed to the first guide rail and to the second guide rail at one end, the cross-member assembly configured to retain the first and second guide rails in adjustable spaced-apart relation and provide unobstructed access between the first and second guide rails at an opposite end.

24. The conveyor frame of claim 23 further comprising a drive mechanism configured to drive the cross-member between extended and retracted positions, the first and second guide rails being laterally positioned in response to extension and retraction of the cross-member.

25. The conveyor frame of claim 23 wherein the first and the second guide rails each comprise an elongate chain track assembly including a conveyor chain supported for movement along the associated guide rail and configured to convey the web of material there along.

26. The conveyor frame of claim 25 wherein each chain track assembly further comprises at least one chain drive assembly configured to movably support and drive the conveyor chain.

27. The conveyor frame of claim 26 wherein the chain drive assembly further comprises a chain tensioner assembly carried by one of the guide rails and configured to apply travel tension to the associated conveyor chain.

28. The conveyor frame of claim 23 wherein the extensible cross-member assembly comprises a screw shaft and a screw drive motor configured to drive the screw shaft for rotation, the screw shaft positioned to mate with at least one of the guide rails in threaded engagement so as to move the guide rail laterally of the other guide rail responsive to rotation of the screw shaft.

29. The conveyor frame of claim 28 wherein the screw shaft has a clockwise thread at one end and a counter-clockwise thread at an opposite end, the one end threadingly engaging one of the frame rails, and the other end threadingly engaging the other of the frame rails.

30. The conveyor frame of claim 23 further comprising a conveyor chain carried for movement by one of the guide rails, and wherein at least one of the frame rails comprises a chain rail having a chain track for receiving the movable conveyor chain, the conveyor chain configured to engage and deliver a web of material for movement along the chain rail.

31. The conveyor frame of claim 30 further comprising a chain drive assembly carried by one of the guide rails and positioned to drive the conveyor chain along a web delivery path of the chain rail.

32. The conveyor frame of claim 30 further comprising a servo-drive motor configured to drive the conveyor chain along a web delivery path of the chain rail.

33. A conveyor frame for movably supporting web-shaped materials, comprising:

a pair of spaced-apart and elongate frame rails positionable to guide a web of material along the frame rails;

an adjustable support frame interconnecting the frame rails, the frame rails being adjustably positioned relative to one another by adjusting the support frame so as to laterally position the pair of frame rails in spaced-apart relation; and one end of the frame rails being supported such that unobstructed access is provided in a region extending substantially between the frame rails adjacent the one end.

34. The conveyor frame of claim 33 wherein the elongate frame rails are each adjustably positioned by the adjustable support frame.

35. The conveyor frame of claim 33 wherein the pair of frame rails each comprise elongate chain track assemblies configured to deliver the web along the frame rails.

36. The conveyor frame of claim 35 wherein the chain track assemblies further comprise at least one chain drive assembly having a chain supported along the frame rail and configured to move the web.

37. The conveyor frame of claim 36 wherein the chain drive assembly further comprises a chain tensioner assembly carried by at least one of the frame rails and configured to tension the chain.

38. The conveyor frame of claim 33 wherein at least one of the frame rails comprises a guide rail for guiding an edge of a web being delivered, and at least another of the frame rails comprises a conveyor for engaging with and delivering an edge of the web along the frame rail.

39. A conveyor for delivering web-shaped materials, comprising:

a support frame;

a pair of spaced-apart and elongate frame rails positioned to deliver a web of material;

a drive assembly carried by at least one of the frame rails and configured to move a web of material lengthwise between the frame rails;

an adjustment mechanism for adjustably coupling together the frame rails in spaced-apart relation so as to position the frame rails along opposite edges of a web of material to be delivered; and an exit end of the frame rails supported for adjustable lateral positioning by the support frame and the adjustment mechanism such that unobstructed access is provided in a region extending between the frame rails adjacent the exit end.

40. The conveyor of claim 39 wherein the adjustment mechanism comprises a screw shaft and a screw drive motor provided at one end of the frame rails, and at least one support rail assembly provided at an opposite end of the frame rails.

41. The conveyor of claim 39 wherein the adjustment mechanism adjustably positions the pair of frame rails in substantially parallel and spaced-apart relation along opposite edges of a web to be delivered.

42. The conveyor of claim 39 wherein the adjustment mechanism is configured to adjustably position the pair of frame rails along opposite edges of the web to be delivered so as to form a taper between the pair of frame rails that accommodates changes in width of the web extending in a direction along the pair of frame rails.

* * * * *

UNITED STATES PATENT AND TRADEMARK OFFICE
CERTIFICATE OF CORRECTION

PATENT NO.  : 5,806,745
DATED       : September 15, 1998
INVENTOR(S) : Jere F. Irwin It is certified that error appears in the above-identified patent and that said Letters Patent is hereby corrected as shown below:

Col. 1, line 58, delete "feed" and insert --fed--.

Col. 4, line 27, after "application", insert --is--.

Col. 4, lines 32-33, delete "an a lower" and insert --and a lower--.

Col. 4, line 47, delete "females" and insert --female--.

Col. 4, line 63, delete "sold be" and insert --sold by--.

Col. 5, line 23, delete "08/635,091" and insert --08/632,930--.

Col. 5, line 23, delete "Apr. 17, 1996" and insert --Apr. 16, 1996--.

Col. 6, lines 43-44, delete "shaft 38" and insert --shaft 36--.

Col. 8, line 54, after end of paragraph, delete "24".

UNITED STATES PATENT AND TRADEMARK OFFICE
CERTIFICATE OF CORRECTION

PATENT NO. : 5,806,745
DATED : September 15, 1998
INVENTOR(S) : Jere F. Irwin

It is certified that error appears in the above-identified patent and that said Letters Patent is hereby corrected as shown below:

Col. 12, line 50, delete "over 12" and insert --oven 12--.

Col. 14, line 42, delete "is plan view." and insert --in plan view.--.

In the Claims

Col. 17, line 35, claim 33: delete the return at the end of the second subparagraph and continue on as part of the same subparagraph with "adjusting the support frame so as to laterally position the pair of frame rails in spaced-apart relation; and".

Signed and Sealed this

Fifth Day of January, 1999

Attest:

*Attesting Officer*

*Acting Commissioner of Patents and Trademarks*